United States Patent
Greco et al.

(10) Patent No.: US 8,108,065 B2
(45) Date of Patent: Jan. 31, 2012

(54) TARGET OF OPPORTUNITY IN AN AUTOMATED DATA STORAGE LIBRARY

(75) Inventors: Paul Merrill Greco, Tucson, AZ (US); Glen Alan Jaquette, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 877 days.

(21) Appl. No.: 11/971,087

(22) Filed: Jan. 8, 2008

(65) Prior Publication Data
US 2009/0174961 A1 Jul. 9, 2009

(51) Int. Cl.
- G06F 7/00 (2006.01)
- G05B 15/00 (2006.01)
- G05B 19/418 (2006.01)

(52) U.S. Cl. ........ 700/214; 700/213; 700/215; 700/222; 700/218; 700/259; 700/248

(58) Field of Classification Search .................. None
See application file for complete search history.

(56) References Cited

U.S. PATENT DOCUMENTS

| | | | |
|---|---|---|---|
| 4,430,705 A | 2/1984 | Cannavino et al. | |
| 5,023,773 A | 6/1991 | Baum et al. | |
| 5,224,163 A | 6/1993 | Gasser et al. | |
| 5,325,505 A | 6/1994 | Hoffecker et al. | |
| 5,522,090 A * | 5/1996 | Tanaka et al. | 710/74 |
| 5,956,198 A | 9/1999 | Kulakowski et al. | |
| 5,986,835 A | 11/1999 | Tanaka et al. | |
| 6,154,840 A | 11/2000 | Pebley et al. | |
| 6,282,152 B1 | 8/2001 | Kurple | |
| 6,785,588 B2 * | 8/2004 | Dimitri et al. | 700/214 |
| 7,116,506 B1 | 10/2006 | Mojica | |
| 7,277,941 B2 | 10/2007 | Ignatius et al. | |
| 7,869,603 B2 | 1/2011 | Goodman et al. | |
| 2002/0178370 A1 | 11/2002 | Gurevich et al. | |
| 2003/0078676 A1 | 4/2003 | Kuribayashi et al. | |
| 2005/0261800 A1 * | 11/2005 | Goodman et al. | 700/214 |
| 2007/0050569 A1 * | 3/2007 | Haustein et al. | 711/154 |
| 2007/0234051 A1 | 10/2007 | Akutsu et al. | |
| 2008/0065898 A1 | 3/2008 | Greco et al. | |
| 2008/0147232 A1 * | 6/2008 | Kuribayashi et al. | 700/160 |
| 2008/0219449 A1 | 9/2008 | Ball et al. | |
| 2009/0174961 A1 | 7/2009 | Greco et al. | |

(Continued)

OTHER PUBLICATIONS

Paul M. Greco, et al., 'Automated Data Storage Library With Target of Opportunity Recognition', pp. 1-60 (includes 11 pgs. of figs), U.S. Appl. No. 11/971,050, filed Jan. 8, 2008.

(Continued)

Primary Examiner — Gene Crawford
Assistant Examiner — Yolanda Cumbess
(74) Attorney, Agent, or Firm — Zilka-Kotab, PC

(57) ABSTRACT

A method is provided for utilizing target of opportunity to perform at least one special operation while a removable storage medium is mounted within a data storage drive for another purpose. A target of opportunity is recognized by determining if at least one special operation may be performed by the data storage drive. If it is determined that at least one special operation may be performed then a first notification that the data storage drive is to remain in a not ready state is sent in response. At least one special operation is performed, and in response to the at least one special operation being performed, a second notification is sent that the removable storage medium is in a ready state or an error state.

23 Claims, 11 Drawing Sheets

U.S. PATENT DOCUMENTS

2009/0174965 A1 7/2009 Greco et al.
2009/0175451 A1 7/2009 Greco et al.
2009/0177314 A1 7/2009 Greco et al.

OTHER PUBLICATIONS

Paul M. Greco, et al., 'Data Storage Drive With Target of Opportunity Recognition', pp. 1-60 (includes 11 pgs. of figs), U.S. Appl. No. 11/971,076, filed Jan. 8, 2008.

Paul M. Greco, et al., 'Target of Opportunity Recognition During an Encryption Related Process', pp. 1-62 (includes 11 pgs. of figs), U.S. Appl. No. 11/971,099, filed Jan. 8, 2008.

Non-Final Office Action Summary from U.S. Appl. No. 11/971,050 dated Nov. 12, 2010.

Non-Final Office Action Summary from U.S. Appl. No. 11/971,099 dated Feb. 15, 2011.

Popek et al., "Encryption and Secure Computer Networks," ACM, Computing Surveys, vol. 11, No. 4, Dec. 1979, pp. 331-356.

Final Office Action Summary from U.S. Appl No. 11/971,099 dated Aug. 4, 2011.

Non-Final Office Action Summary from U.S. Appl. No. 11/971,076 dated Apr. 27, 2011.

Final Office Action Summary from U.S. Appl. No. 11/971,050 dated May 12, 2011.

Final Office Action Summary from U.S. Appl. No. 11/971,076 dated Oct. 18, 2011.

\* cited by examiner

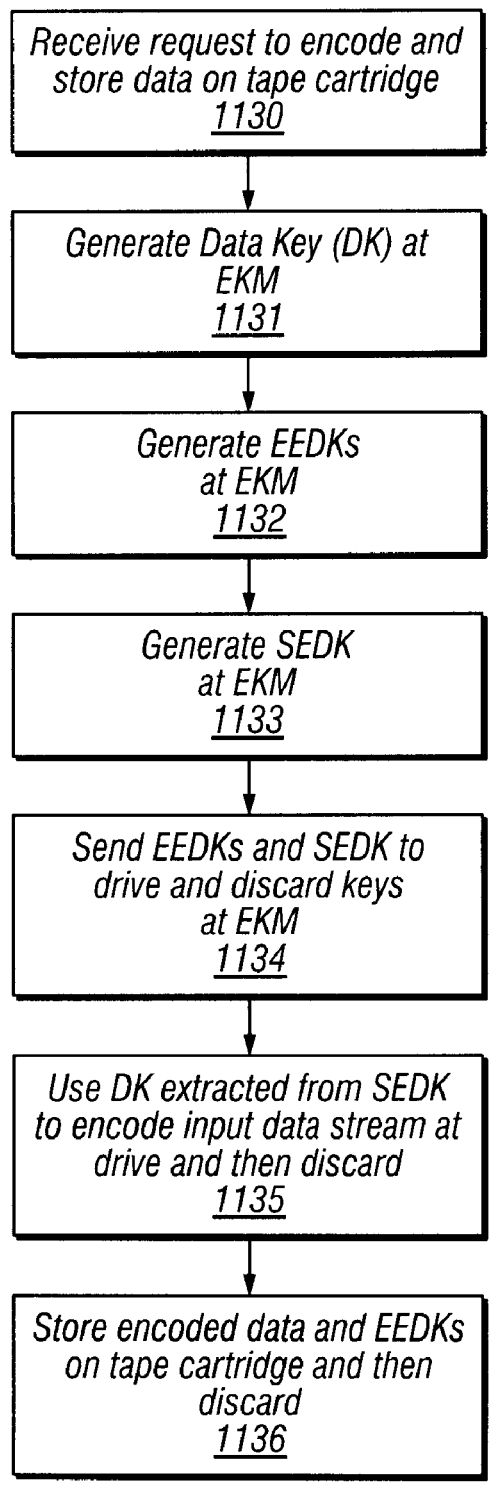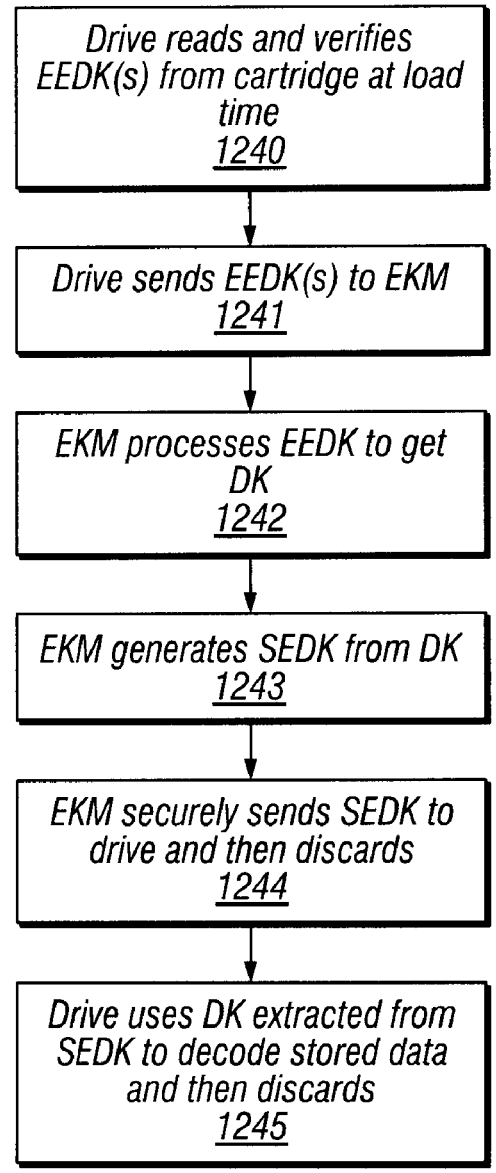
FIG. 11
FIG. 12

US 8,108,065 B2

TARGET OF OPPORTUNITY IN AN AUTOMATED DATA STORAGE LIBRARY

RELATED APPLICATION DATA

This application is related to commonly-assigned and co-pending U.S. application Ser. No. 11/971,050, filed on the same date herewith, entitled "Automated Data Storage Library With Target of Opportunity Recognition", which is incorporated herein by reference in its entirety. This application is also related to commonly-assigned and co-pending U.S. application Ser. No. 11/971,076, filed on the same date herewith, entitled "Data Storage Drive With Target of Opportunity Recognition", which is incorporated herein by reference in its entirety. In addition, this application is related to commonly-assigned and co-pending U.S. application Ser. No. 11/971,099, filed on the same date herewith, entitled "Target of Opportunity Recognition During an Encryption Related Process", which is incorporated herein by reference in its entirety.

FIELD OF THE INVENTION

This invention relates to data storage, and more particularly, to utilizing target of opportunity to actions taken with respect to data storage drives and/or data storage cartridges.

BACKGROUND OF THE INVENTION

Automated data storage libraries are known for providing cost effective storage and retrieval of large quantities of data. The data in automated data storage libraries is stored on data storage media that are, in turn, stored on storage shelves or the like inside the library in a fashion that renders the media, and its resident data, accessible for physical retrieval. Such media is commonly termed "removable media." Data storage media may comprise any type of media on which data may be stored and which may serve as removable media, including but not limited to magnetic media (such as magnetic tape or disks), optical media (such as optical tape or disks), electronic media (such as PROM, EEPROM, flash PROM, MRAM, Compactflash™, Smartmedia™, Memory Stick™, etc.), or other suitable media. Typically, the data stored in automated data storage libraries is resident on data storage media that is contained within a cartridge and referred to as a data storage media cartridge. An example of a data storage media cartridge that is widely employed in automated data storage libraries for mass data storage is a magnetic tape cartridge.

In addition to data storage media, automated data storage libraries typically contain one or more data storage drives that store data to, and/or retrieve data from, the data storage media. Transporting data storage media between data storage shelves and data storage drives is typically accomplished by one or more robot accessors (hereinafter termed "accessors"). Such accessors have grippers for physically retrieving the selected data storage media from the storage shelves within the automated data storage library and transport the retrieved media to the data storage drives by moving in the X and/or Y directions.

SUMMARY OF THE INVENTION

A method is provided for utilizing target of opportunity to perform at least one special operation while a removable storage medium is mounted within a data storage drive for another purpose. A target of opportunity is recognized by determining if at least one special operation may be performed by the data storage drive. If it is determined that at least one special operation may be performed then a first notification that the data storage drive is to remain in a not ready state is sent in response. At least one special operation is performed, and in response to the at least one special operation being performed, a second notification is sent that the removable storage medium is in a ready state or an error state.

In one embodiment the removable storage medium is mounted within the data storage drive before it is determined that at least one special operation may be performed. In another embodiment the removable storage medium is mounted within the data storage drive after it is determined that at least one special operation may be performed.

Either the data storage drive or the automated data storage library determines if at least one special operation may be performed. In one embodiment, the determination that at least one special operation may be performed is accomplished by evaluating parameters against predetermined criteria. The parameters may comprise a number of mounts since the most recent identical special operation was performed. In another embodiment, the parameters may comprise an amount of time transpired since the most recent identical special operation was performed. The predetermined criteria may comprise a predetermined maximum threshold number of mounts. In another embodiment the predetermined criteria may comprise a predetermined maximum threshold of time transpired. The predetermined criteria may be defined by a user.

In one embodiment the data storage drive determines that at least one special operation may be performed. In one described embodiment the parameters are stored within the removable storage medium. In another embodiment, the automated data storage library determines that at least one special operation may be performed. Further, the parameters may be stored within the automated data storage library.

In yet another embodiment the removable storage medium is a tape cartridge, and the data storage drive is a tape drive. In one embodiment, the tape drive determines that at least one special operation may be performed. The parameters may be stored within the tape cartridge. More specifically, the parameters may be stored in at least one non-user area of the tape cartridge. In another embodiment, the tape library determines that at least one special operation may be performed. The parameters may be stored within the tape library.

In one embodiment the parameters may be the number of mounts since a most recent refresh, the number of mounts since a most recent media check, the number of mounts since a most recent servo format integrity check, the number of mounts since a most recent media diagnostic, the number of mounts since a most recent rekey, the number of mounts since a most recent key retirement, the number of mounts since a most recent key migration, the amount of time transpired since the most recent refresh, the amount of time transpired since the most recent media check, the amount of time transpired since the most recent servo format integrity check, the amount of time transpired since the most recent media diagnostic, the amount of time transpired since the most recent rekey, the amount of time transpired since the most recent key retirement, or the amount of time transpired since the most recent key migration. In a further embodiment, the determination that at least one special operation may be performed is based on an explicit pending request.

The at least one special operation may include refreshing the tape cartridge, performing a media check, performing a servo format integrity check, performing a tape media diagnostic on the tape cartridge, performing a rekey operation, performing a key migration operation, and performing a key retirement operation.

BRIEF DESCRIPTION OF THE DRAWINGS

FIG. 11 is a logical flowchart of the steps to encode and store data;

FIG. 12 is a logical flowchart of the steps used to read and decode stored data.

DETAILED DESCRIPTION OF THE INVENTION

This invention is described in preferred embodiments in the following description with reference to the Figures, in which like numerals represent the same or similar elements. The following is intended to provide a detailed description of an example of the invention and should not be taken to be limiting of the invention itself. Rather, any number of variations may fall within the scope of the invention which is defined in the claims following the description.

The invention will be described as embodied in an automated magnetic tape library storage system for use in a data processing environment. Although the invention shown uses magnetic tape cartridges, one skilled in the art will recognize the invention equally applies to optical disk cartridges, optical tape cartridges, and magnetic disk cartridges or other removable storage media and the use of either different types of cartridges or cartridges of the same type having different characteristics. Herein, data storage media may be referred to as tape media, but broadly includes optical disk media, optical tape media, and magnetic disk media and other removable storage media. Similarly, data storage cartridge may be referred to as tape cartridge herein, but broadly includes optical disk cartridges, optical tape cartridges, and magnetic disk cartridges, and other removable storage media cartridges. Furthermore, the description of an automated magnetic tape storage system or library is not meant to limit the invention to magnetic tape data processing applications as the invention herein can be applied to any media storage and cartridge handling systems or libraries in general. Herein, automated data library may be referred to herein as a tape library or an automated magnetic tape library, but broadly includes any optical disk storage, optical tape, or magnetic disk system or library and other removable storage media systems or libraries.

Figure 1:
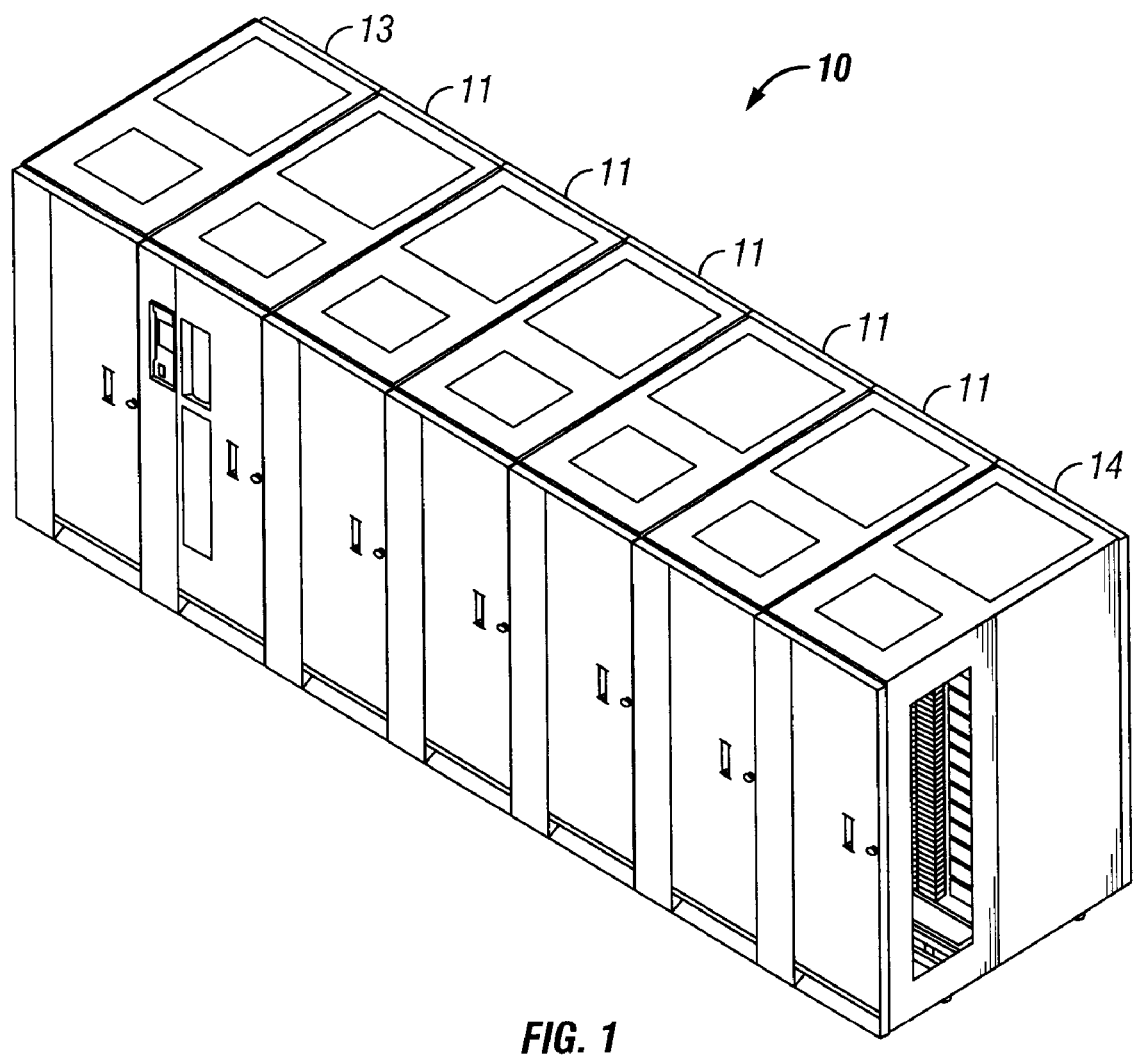
FIG. 1 is an isometric view of an automated data storage library adaptable to implement an embodiment of the present invention, with the view specifically depicting an automated data storage library having a left hand service bay, multiple storage frames and a right hand service bay.
Figure 2:
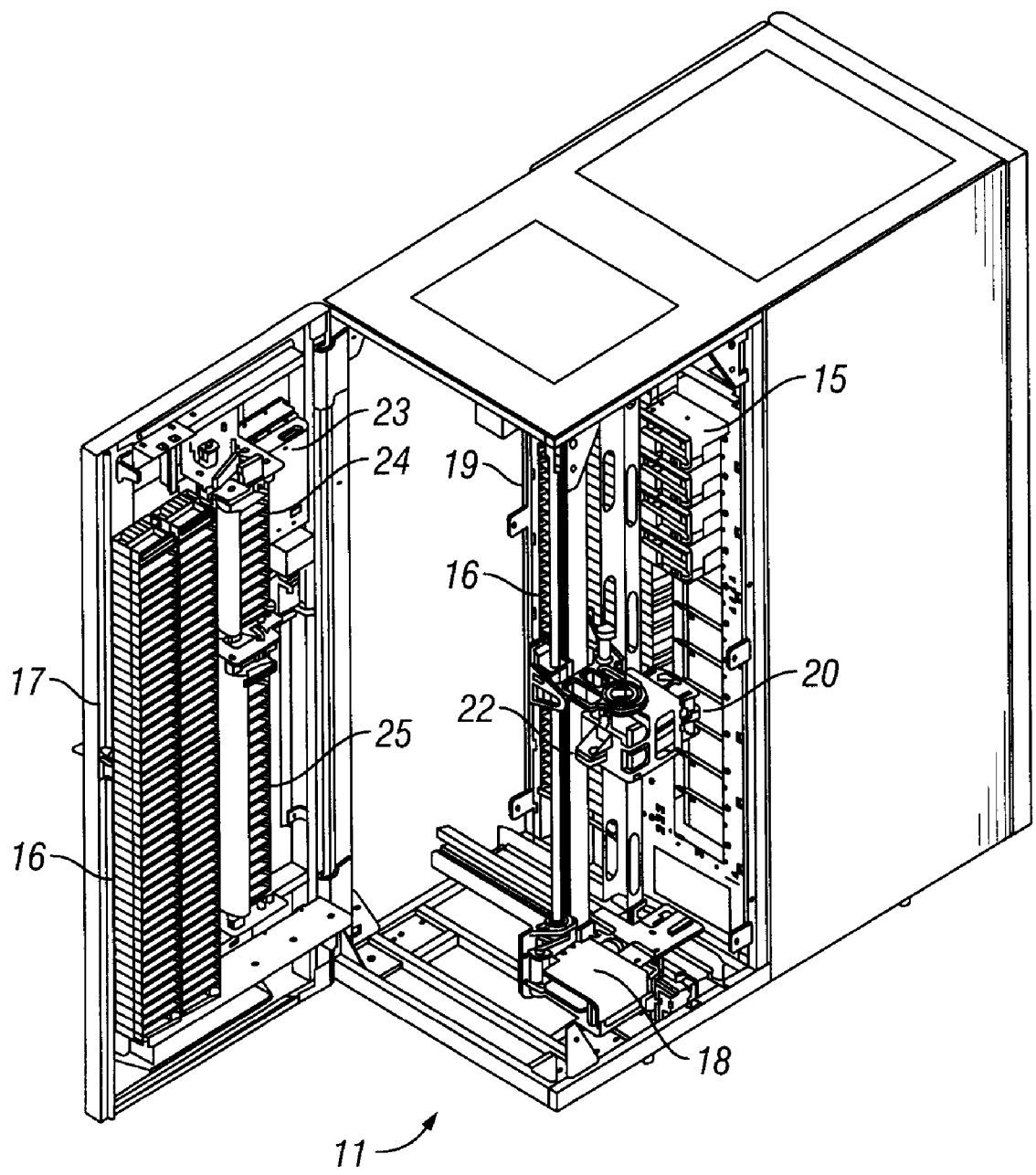
FIG. 2 is an isometric view of an automated data storage library adaptable to implement an embodiment of the present invention, with the view specifically depicting an exemplary basic configuration of the internal components of an automated data storage library.

Turning now to the Figures, FIGS. 1 and 2 illustrate an automated data storage library 10 which stores and retrieves data storage cartridges containing data storage media (not shown) in storage shelves 16. It is noted that references to "data storage media" herein refer to data storage cartridges, and for purposes herein the two terms are used synonymously. An example of an automated data storage library which may implement the present invention, and has a configuration as depicted in FIGS. 1 and 2, is the IBM 3584 UltraScalable Tape Library. The automated data storage library of FIG. 1 comprises a left hand service bay 13, one or more storage frames 11, and right hand service bay 14. As will be discussed, a frame may comprise an expansion component of the automated data storage library. Frames may be added or removed to expand or reduce the size and/or functionality of the library. Frames may comprise additional storage shelves, drives, import/export stations, accessors, operator panels, etc.

FIG. 2 shows an example of a storage frame 11, which is the base frame of the automated data storage library 10 and is contemplated to be the minimum configuration of an automated data storage library 10. In this minimum configuration, there is only a single accessor (i.e. there are no redundant accessors) and there is no service bay. The automated data storage library 10 is arranged for accessing data storage media in response to commands from at least one external host system (not shown), and comprises a plurality of storage shelves 16, one front wall 17 and rear wall 19 for storing data storage cartridges that contain data storage media; at least one data storage drive 15 for reading and/or writing data with respect to the data storage media; and a first accessor 18 for transporting the data storage media between the plurality of storage shelves 16 and the data storage drive(s) 15. The data storage drives 15 may be optical disk drives or magnetic tape drives, or other types of data storage drives as are used to read and/or write data with respect to the data storage media. The storage frame 11 may optionally comprise an operator panel 23 or other user interface, such as a web-based interface, which allows a user to interact with the automated data storage library 10. The storage frame 11 may optionally comprise an upper I/O station 24 and/or a lower I/O station 25, which allows data storage media to be inserted into the automated data storage library 10 and/or removed from the automated data storage library 10 without disrupting library operation. As used herein, "storage cell" refers to any location within an automated data storage library 10 that may hold a data storage cartridge, such as but without limitation, storage shelves 16, the storage shelves of an I/O station 24-25, or the media slot of a data storage drive 15. The automated data storage library 10 may comprise one or more storage frames 11, each having storage shelves 16 accessible by first accessor 18.

As described above, the storage frames 11 may be configured with different components depending upon the intended function. One configuration of storage frame 11 may comprise storage shelves 16, data storage drive(s) 15, and other optional components to store and retrieve data from the data storage cartridges. The first accessor 18 comprises a gripper assembly 20 for gripping one or more data storage media and may include a bar code scanner 22 or other reading system, such as a cartridge memory reader or similar system, mounted on the gripper 20, to "read" identifying information about the data storage media.

Figure 3:
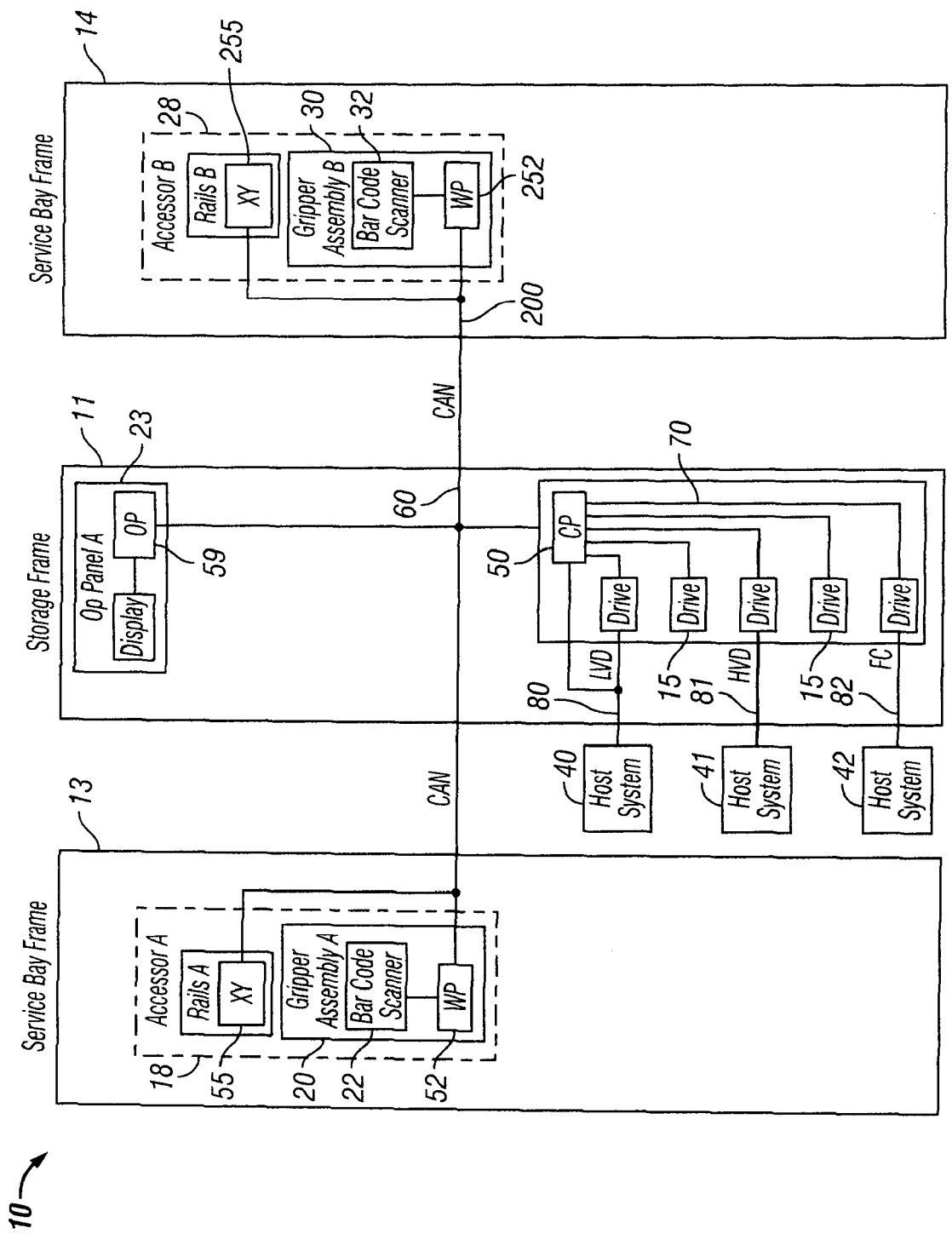
FIG. 3 is a block diagram of an automated data storage library adaptable to implement an embodiment of the present invention, with the diagram specifically depicting an automated data storage library that employs a distributed system of modules with a plurality of processor nodes.

FIG. 3 illustrates an embodiment of an automated data storage library 10 of FIGS. 1 and 2, which employs a distributed system of modules with a plurality of processor nodes. An example of an automated data storage library which may implement the distributed system depicted in the block diagram of FIG. 3, and which implement the present invention, is the IBM 3584 UltraScalable Tape Library.

While the automated data storage library 10 has been described as employing a distributed control system, the present invention may be implemented in automated data storage libraries regardless of control configuration, such as, but not limited to, an automated data storage library having one or more library controllers that are not distributed. Herein, a distributed control system comprising various nodes, a library controller or controllers, etc., are referred to as "library controller", or "controller" interchangeably. The automated data storage library 10 of FIG. 3 comprises one or more storage frames 11, a left hand service bay 13 and a right hand service bay 14. The left hand service bay 13 is shown with a first accessor 18. As discussed above, the first accessor 18 comprises a gripper assembly 20 and may include a reading system 22 to "read" identifying information about the data storage media. The right hand service bay 14 is shown with a second accessor 28. The second accessor 28 comprises a gripper assembly 30 and may include a reading system 32 to "read" identifying information about the data storage media. In the event of a failure or other unavailability of the first accessor 18, or its gripper 20, etc., the second accessor 28 may perform some or all of the functions of the first accessor 18. The two accessors 18, 28 may share one or more mechanical paths or they may comprise completely independent mechanical paths. In one example, the accessors 18, 28 may have a common horizontal rail with independent vertical rails. The first accessor 18 and the second accessor 28 are described as first and second for descriptive purposes only and this description is not meant to limit either accessor to an association with either the left hand service bay 13, or the right hand service bay 14.

In the exemplary automated data storage library 10, first accessor 18 and second accessor 28 move their grippers in at least two directions, called the horizontal "X" direction and vertical "Y" direction, to retrieve and grip, or to deliver and release the data storage media at the storage shelves 16 and to load and unload the data storage media at the data storage drives 15. The terms "load" and "mount" are herein used interchangeably to refer to placing the data storage media into the data storage drive 15. Further, the terms "unload" and "demount" are herein used interchangeably to refer to removing the data storage media into the data storage drive 15.

The exemplary automated data storage library 10 receives commands from one or more host systems 40, 41 or 42. The host systems, such as host servers, communicate with the automated data storage library 10 directly, e.g. on path 80, through one or more control ports (not shown), or through one or more data storage drives 15 on paths 81, 82, providing commands to access particular data storage media and move the data storage media, for example, between the storage shelves 16 and the data storage drives 15. The commands are typically logical commands identifying the media and/or logical locations for accessing the media. The terms "commands" and "work requests" are used interchangeably herein to refer to such communications from the host system 40, 41 or 42 to the automated data storage library 10 as are intended to result in accessing particular data storage media within the automated data storage library 10.

The exemplary automated data storage library 10 is controlled by a distributed control system receiving the logical commands from hosts, determining the required actions, and converting the actions to physical movements of first accessor 18 and/or second accessor 28.

In the exemplary automated data storage library 10, the distributed control system comprises a plurality of processor nodes, each having one or more processors. In one example of a distributed control system, a communication processor node 50 may be located in a storage frame 11. The communication processor node provides a communication link for receiving the host commands, either directly or through the data storage drives 15, via at least one external interface, e.g. coupled to line 80.

The communication processor node 50 may additionally provide a communication link 70 for communicating with the data storage drives 15. The communication processor node 50 may be located in the frame 11, close to the data storage drives 15. Additionally, in an example of a distributed processor system, one or more additional work processor nodes are provided, which may comprise, e.g. a work processor node 52 that may be located at first accessor 18, and that is coupled to the communication processor node 50 via a network 60, 157. Each work processor node may respond to received commands that are broadcast to the work processor nodes from any communication processor node, and the work processor nodes may also direct the operation of the accessors, providing move commands. An XY processor node 55 may be provided and may be located at an XY system of first accessor 18. The XY processor node 55 is coupled to the network 60, 157, and is responsive to the move commands, operating the XY system to position the gripper 20.

Also, an operator panel processor node 59 may be provided at the optional operator panel 23 for providing an interface for communicating between the operator panel and the communication processor node 50, the work processor nodes 52, 252, and the XY processor nodes 55, 255.

A network, for example comprising a common bus 60, is provided, coupling the various processor nodes. The network may comprise a robust wiring network, such as the commercially available CAN (Controller Area Network) bus system, which is a multi-drop network, having a standard access protocol and wiring standards, for example, as defined by CiA, the CAN in Automation Association, Am Weich Selgarten 26, D-91058 Erlangen, Germany. Other networks, such as Ethernet, or a wireless network system, such as RF or infrared, may be employed in the automated data storage library 10 as is known to those of skill in the art. In addition, multiple independent networks may also be used to couple the various processor nodes.

The communication processor node 50 is coupled to each of the data storage drives 15 of a storage frame 11, via lines 70, communicating with the data storage drives 15 and with host systems 40, 41 and 42. Alternatively, the host systems 40, 41 and 42 may be directly coupled to the communication processor node 50, at input line 80 for example, or to control port devices (not shown) which connect the automated data storage library 10 to the host system(s) 40, 41 and 42 with an automated data storage library interface similar to the drive/library interface. As is known to those of skill in the art, various communication arrangements may be employed for communication with the hosts and with the data storage drives. In the example of FIG. 3, host connections 80 and 81 are SCSI busses. Bus 82 comprises an example of a Fibre Channel bus which is a high speed serial data interface, allowing transmission over greater distances than the SCSI bus systems.

The data storage drives 15 may be in close proximity to the communication processor node 50, and may employ a short distance communication scheme, such as SCSI, or a serial connection, such as RS-422. The data storage drives 15 are thus individually coupled to the communication processor node 50 by means of lines 70. Alternatively, the data storage drives 15 may be coupled to the communication processor node 50 through one or more networks, such as a common bus network.

Additional storage frames 11 may be provided and each is coupled to the adjacent storage frame. Any of the storage frames 11 may comprise communication processor nodes 50, storage shelves 16, data storage drives 15, and networks 60.

Further, as described above, the automated data storage library 10 may comprise a plurality of accessors. A second accessor 28, for example, is shown in a right hand service bay 14 of FIG. 3. The second accessor 28 may comprise a gripper 30 for accessing the data storage media, and an XY processor node 255 for moving the second accessor 28. The second accessor 28 may run on the same horizontal mechanical path as first accessor 18, or on an adjacent path. The exemplary control system additionally comprises an extension network 200 forming a network coupled to network 60 of the storage frame(s) 11 and to the network 157 of left hand service bay 13.

The foregoing described embodiments wherein the different components are contained within different other components. It is to be understood that such depicted architectures are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality.

In FIG. 3 and the accompanying description, the first accessor 18 and second accessor 28 are associated with the left hand service bay 13 and the right hand service bay 14 respectively. This is for illustrative purposes and there may not be an actual association. In addition, network 157 may not be associated with the left hand service bay 13 and network 200 may not be associated with the right hand service bay 14. Depending on the design of the automated data storage library 10, it may not be necessary to have a left hand service bay 13 and/or a right hand service bay 14.

Figure 4:
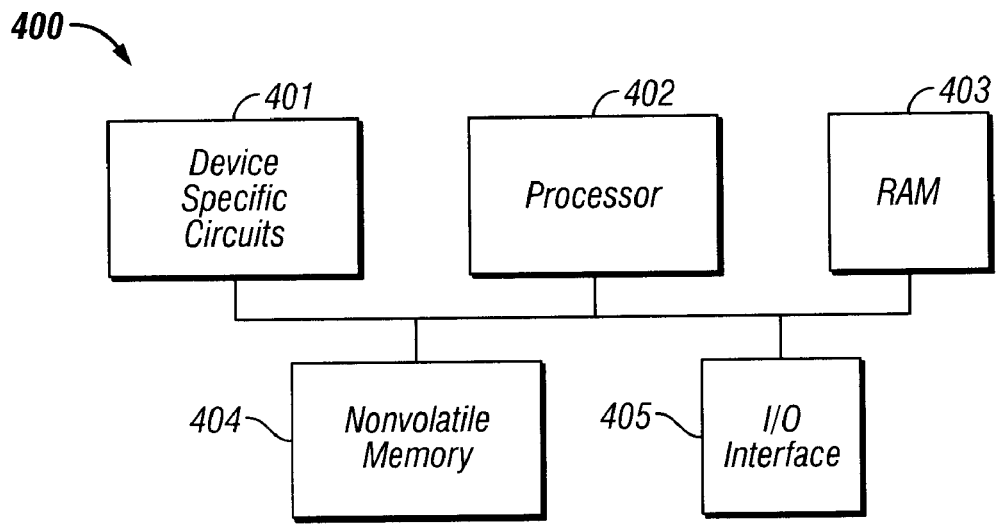
FIG. 4 is a block diagram depicting an exemplary controller configuration.

An automated data storage library 10 typically comprises one or more controllers to direct the operation of the automated data storage library 10. Host computers and data storage drives may comprise similar controllers. A controller may take many different forms and may comprise, for example but not limited to, an embedded system, a distributed control system, a personal computer, or a workstation. Essentially, the term "controller" as used herein is intended in its broadest sense as a device that contains at least one processor, as such term is defined herein. FIG. 4 shows a typical controller 400 (also referred to herein as library controller 400) with a processor 402, RAM (Random Access Memory) 403, nonvolatile memory 404, device specific circuits 401, and I/O interface 405. Alternatively, the RAM 403 and/or nonvolatile memory 404 may be contained in the processor 402 as could the device specific circuits 401 and I/O interface 405. The processor 402 may comprise, for example, an off-the-shelf microprocessor, custom processor, FPGA (Field Programmable Gate Array), ASIC (Application Specific Integrated Circuit), discrete logic, or the like. The RAM (Random Access Memory) 403 is typically used to hold variable data, stack data, executable instructions, and the like. The nonvolatile memory 404 may comprise any type of nonvolatile memory such as, but not limited to, PROM (Programmable Read Only Memory), EEPROM (Electrically Erasable Programmable Read Only Memory), flash PROM (Programmable Read Only Memory), NVRAM (Non-Volatile Random Access Memory), MRAM (Magnetoresistive Random Access Memory), battery backup RAM, CD (Compact Disk), DVD (Digital Versatile Disk), hard disk drives, etc. The nonvolatile memory 404 is typically used to hold the executable firmware and any nonvolatile data. The I/O interface 405 comprises a communication interface that allows the processor 402 to communicate with devices external to the controller. Examples may comprise, but are not limited to, serial interfaces such as RS-232, USB (Universal Serial Bus), SCSI (Small Computer Systems Interface), Fibre Channel, etc. The device specific circuits 401 provide additional hardware to enable the controller 400 to perform unique functions such as, but not limited to, motor control of a cartridge gripper. The device specific circuits 401 may comprise electronics that provide, by way of example but not limitation, Pulse Width Modulation (PWM) control, Analog to Digital Conversion (ADC), Digital to Analog Conversion (DAC), etc. In addition, all or part of the device specific circuits 401 may reside outside the controller 400.

While the automated data storage library 10 is described as employing a distributed control system, the present invention may be implemented in various automated data storage libraries regardless of control configuration, such as, but not limited to, an automated data storage library having one or more library controllers that are not distributed. A library controller may comprise one or more dedicated controllers of a prior art library. For example, there may be a primary controller and a backup controller. In addition, a library controller may comprise one or more processor nodes of a distributed control system. For example, communication processor node 50 (FIG. 3) may comprise the library controller while the other processor nodes (if present) may assist the library controller and/or may provide backup or redundant functionality. In another example, communication processor node 50 and work processor node 52 may work cooperatively to comprise the library controller while the other processor nodes (if present) may assist the library controller and/or may provide backup or redundant functionality. Still further, all of the processor nodes may comprise the library controller. Herein, library controller may comprise a single processor or controller or it may comprise multiple processors or controllers.

Figure 5:
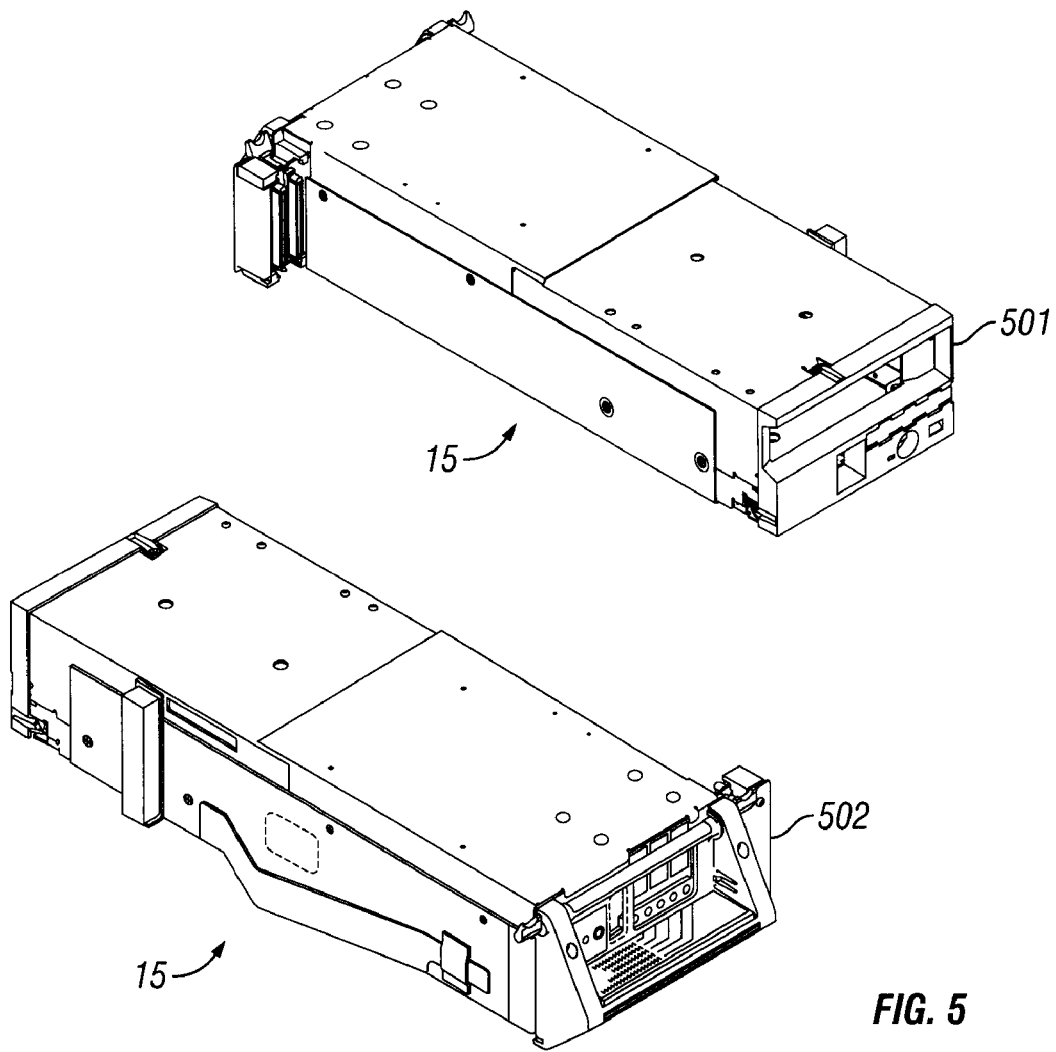
FIG. 5 is an isometric view of the front and rear of a data storage drive adaptable to implement an embodiment of the present invention.

FIG. 5 illustrates an embodiment of the front 501 and rear 502 of a data storage drive 15. In the example of FIG. 5, the data storage drive 15 comprises a hot-swap drive canister. This is only an example and is not meant to limit the invention to hot-swap drive canisters. In fact, any configuration of data storage drive may be used whether or not it comprises a hot-swap canister.

Figure 6:
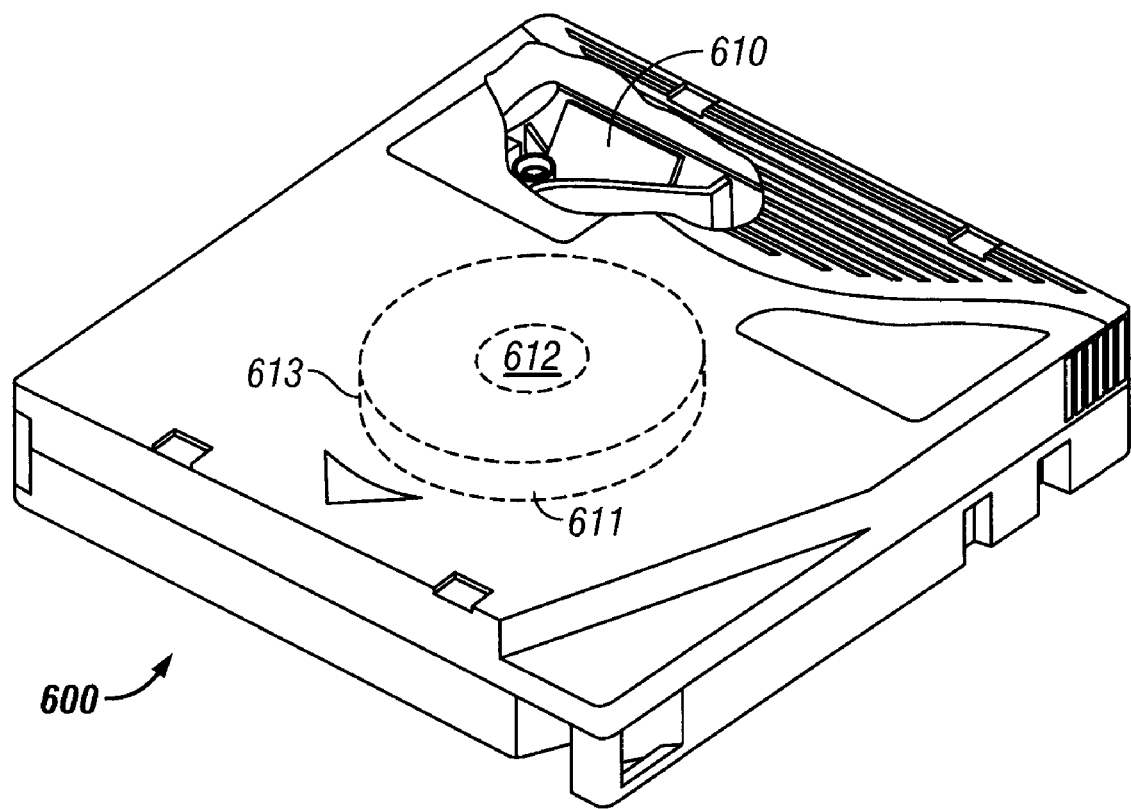
FIG. 6 is an isometric view of data storage cartridge adaptable to implement an embodiment of the present invention.

FIG. 6 illustrates an embodiment of a data storage cartridge 600 (also referred to herein as tape cartridge 600) which includes a non-volatile read/writable cartridge memory (CM) 610 (shown in a cutaway), and a rewritable storage media 611, such as a high capacity single reel of magnetic tape (shown in phantom) wound on a hub 612 of a reel 613. The cartridge memory 610 is a passive storage device that includes a transponder that provides a contactless interface, and is used to hold information about that specific cartridge, the medium in the cartridge, and the data on the medium. Examples of magnetic tape cartridges comprise a cartridge based on LTO (Linear Tape Open) technology, such as the IBM TotalStorage LTO Ultrium Data Cartridge, and a cartridge based on IBM's 3592 technology, such as the IBM 3592 Enterprise Tape Cartridge. As will be appreciated, the data storage cartridge 600 may be a magnetic tape cartridge having dual reel cartridges (in which the tape is fed between reels within the cartridge) or single reel cartridges, such as illustrated in FIG. 6, in which the rewritable storage media 611 is wound on a reel 613 within the data storage cartridge 600. For example, when the data storage cartridge 600 is loaded, the tape is fed between the cartridge reel and a take up reel (not shown). While exemplary tape cartridges based on the LTO and 3592 formats have been described, it will be appreciated that the description is not limited by tape format. Examples of other tape formats include DLT, SDLT, 9840, 9940, T100000, AIT and the like. Furthermore, it should be noted, some tape formats do not include cartridge memories (e.g. 3590), while others have a cartridge memory requiring contact (e.g. AIT).

There are certain operations relating to a tape cartridge which are desirable to perform on either a periodic basis or based on predetermined criteria relating to a specific tape cartridge or set of tape cartridges. Such operations may include a tape refresh, a media check, a servo format integrity check, or other media diagnostic. In addition, in an encryption capable device, it may be advantageous to perform a rekey, key retirement, and key migration operations on a periodic basis or based on predetermined criteria. Finally, it may be advantageous to perform an unauthorized request alert based on predetermined criteria.

Currently, to perform the above described operations, the tape cartridge must be specifically mounted and/or a key session opened for each operation, the operation is performed and then the tape cartridge is demounted and/or the key session is closed. Each mount and demount and each key session created consumes resources (e.g. device allocation), and may impact overall system performance.

Further, in some instances, the interface which makes the most sense to manage things from may be unable to cause the necessary events to occur. For example, a key manager may not be able to identify which keys are on which tape cartridges, and, therefore, cannot cause tapes to be mounted. Therefore, what is needed is a method that allows for performing additional operations during the target of opportunity of a tape cartridge mount or an open key session.

Target of opportunity broadly refers to the occasion when it is recognized by a controlling agent that while performing one task, at least one additional task may be performed at the same time and/or with the same resources. The controlling agent may be defined as the device that recognizes that a target of opportunity exists and performs or causes another device to perform at least one special operation, taking advantage of the target of opportunity. When a tape cartridge is mounted or when a key session is opened with a key manager for another purpose, target of opportunity may be used to perform certain additional or special operation(s) in a transparent manner or semi-transparent manner while only requiring little, if any, additional resources and/or time.

In one set of examples, a special operation may be a tape refresh, a media check, a servo format integrity check, or other media diagnostic. In another set of examples, a special operation may be one of a rekey, key retirement, a key migration operation, or an unauthorized request alert.

A tape refresh may be described as a physical unspool and respool of the tape media in one continuous, smooth motion. The tape refresh cleanly stacks the tape media with a uniform tension.

As explained above, target of opportunity may be used during a tape mount to perform a media check to determine if the tape media 611 may be defective. Commonly when data on a tape is read only a small portion that corresponds to the location of the data is read. The media check may advantageously read larger portions of the tape to determine if other portions other than the requested read portion of the tape may be wearing out. Examples of a media check include a read only dataset check and a read only host record check. In one example, the read only dataset check reads at the dataset layer and may check for error code correction (ECC) to determine the amount of error correction needed to read the data sets. In one example, the read only host record check includes an attempt to read data on the media as a host would read it, including decompressing the data. The read only record check may include verifying record counts with data set information tables (DSITs) and other structures used by the logical format that can be checked for correctness.

A further embodiment utilizing the advantages of target of opportunity while a tape is mounted includes a servo format integrity check of the tape media 611. As understood by one of ordinary skill in the art, a servo format is encoded on the tape for at the time of manufacture and is required to position both longitudinally and laterally on the tape media. Problems with degraded servo format can result in capacity loss or permanent errors. Rather than losing valuable data, the user may take a proactive approach and upon the first sign of degradation of the tape media based on a missed tracking of the servo signal, the data on the tape may be reclaimed and transferred to another tape cartridge. The servo format integrity check may determine the usability of the tape media 611 for reading and/or writing in a non-destructive manner. The servo format integrity check may be run at the write tolerance limits to determine if the position of the media can be accurately tracked by the head during a read and/or write process.

A further embodiment target of opportunity may be used during a tape mount to perform any number of media diagnostics to determine if the tape media 611 may be, or soon will be, defective. One example of media diagnostics may include a destructive write (in which data is overwritten) and then a read and/or verification test as described above with respect to the servo format integrity check. Other examples of a media diagnostic, while not limiting, include creeping tests, tension/drag monitor and tape media direction tests.

Still a further embodiment of target of opportunity may be one of a rekey, key retirement and key migration operation. A "rekey" operation or "rekeying" refers to an operation to change the key used for a removable storage media, wherein the key to change may comprise a key encrypting key (KEK) or the actual encryption key used to encrypt the data (the data key). The method of rekeying, key retirement and key migration are discussed further below with respect to an embodiment of target of opportunity related to encryption.

The controlling agent (e.g. automated data storage library 10 or the data storage drive 15) may determine if at least one special operation may be performed based on comparing and/or evaluating a parameter that is monitored, tracked and/or stored against predetermined criteria. The predetermined criteria may be set by a user. Furthermore, the user may set a maximum threshold for the predetermined criteria. Generally, a predetermined maximum threshold may be defined as the maximum threshold that is expected to not cause errors, but after which, at least one special operation is recommended to avoid possible future errors.

It should be noted that in one embodiment the controlling agent may be the automated data storage library 10. In another embodiment, the controlling agent may be the data storage drive 15.

For example, to determine if at least one special operation, such as a refresh, may be performed, the number of mounts since the most recent refresh may be compared or evaluated against a predetermined maximum threshold number of mounts. If the number of mounts since the most recent refresh is greater than a predetermined maximum threshold number of mounts then it may be determined that the special operation of a refresh may be performed. By determining that a special operation may be performed, the automated data storage library 10 or the data storage drive 15, recognize a target of opportunity.

In another embodiment, to determine if at least one special operation such as a refresh may be performed, the amount of time transpired since the most recent refresh may be compared or evaluated against the predetermined maximum threshold of time transpired. If the amount of time transpired since the most recent refresh is greater than the predetermined maximum threshold of time transpired then it may be determined a special operation of a refresh may be performed and a target of opportunity is recognized.

For example, predetermined criteria may be set by a user to refresh a tape cartridge every 6 months, such that the maximum threshold of time is 6 months. If the amount of time transpired since the most recent refresh is greater than 6 months (e.g. the predetermined maximum threshold of time) then it may be determined a special operation of a refresh may be performed such that a target of opportunity is recognized.

Further, the predetermined criteria may be set by the user to refresh the tape cartridge upon every 50 tape cartridge mounts, such that the maximum threshold of mounts is 50 tape cartridge mounts. If the number of mounts since the most recent refresh is greater than 50 tape cartridge mounts (e.g. the predetermined maximum threshold number of mounts) then it may be determined that the special operation of a refresh may be performed such that a target of opportunity is recognized.

While the provided examples of determining whether at least one special operation may be performed may be described with reference to a tape refresh, one of ordinary skill in the art would understand that any special operation as described above or below may be determined in the same manner. For example, the automated data storage library 10 or the data storage drive 15 may determine whether or not at least one special operation may be performed based on parameters such the number of reads and/or writes since the most recent identical special operation, the age of the tape cartridge 600 or the number times the tape cartridge 600 has been mounted in the lifetime of the tape cartridge 600. As one of ordinary skill in the art would understand these parameters may also be evaluated or compared, in the same manner as discussed above, against predetermined criteria such as a predetermined maximum threshold number of reads, predetermined maximum threshold number of writes, predetermined maximum tape cartridge lifetime threshold or a predetermined maximum lifetime threshold number of mounts. Further, the automated data storage library 10 or the data storage drive 15 may determine at least one special operation may be performed based on an explicit pending request (e.g. a command to rekey the tape cartridge 600 the next time the tape cartridge 600 is mounted in the data storage drive 15).

It should be understood that the parameters for determining any special operation may be monitored, tracked and/or stored in the automated data storage library 10. For example, the parameters may be stored in a database in the automated data storage library that stores information for each given data storage cartridge 600 within the data storage library 10. In another embodiment the parameters for determining any special operation may be monitored, tracked and/or stored in the data storage cartridge 600. For example, the parameters may be stored in portions of non-user areas of the data storage cartridge 600 such as the cartridge memory 610. In yet another embodiment, the parameters to determine the need for the tape refresh may be monitored, tracked and/or stored in both the data storage cartridge 600 and the automated data storage library 10.

Figure 7:
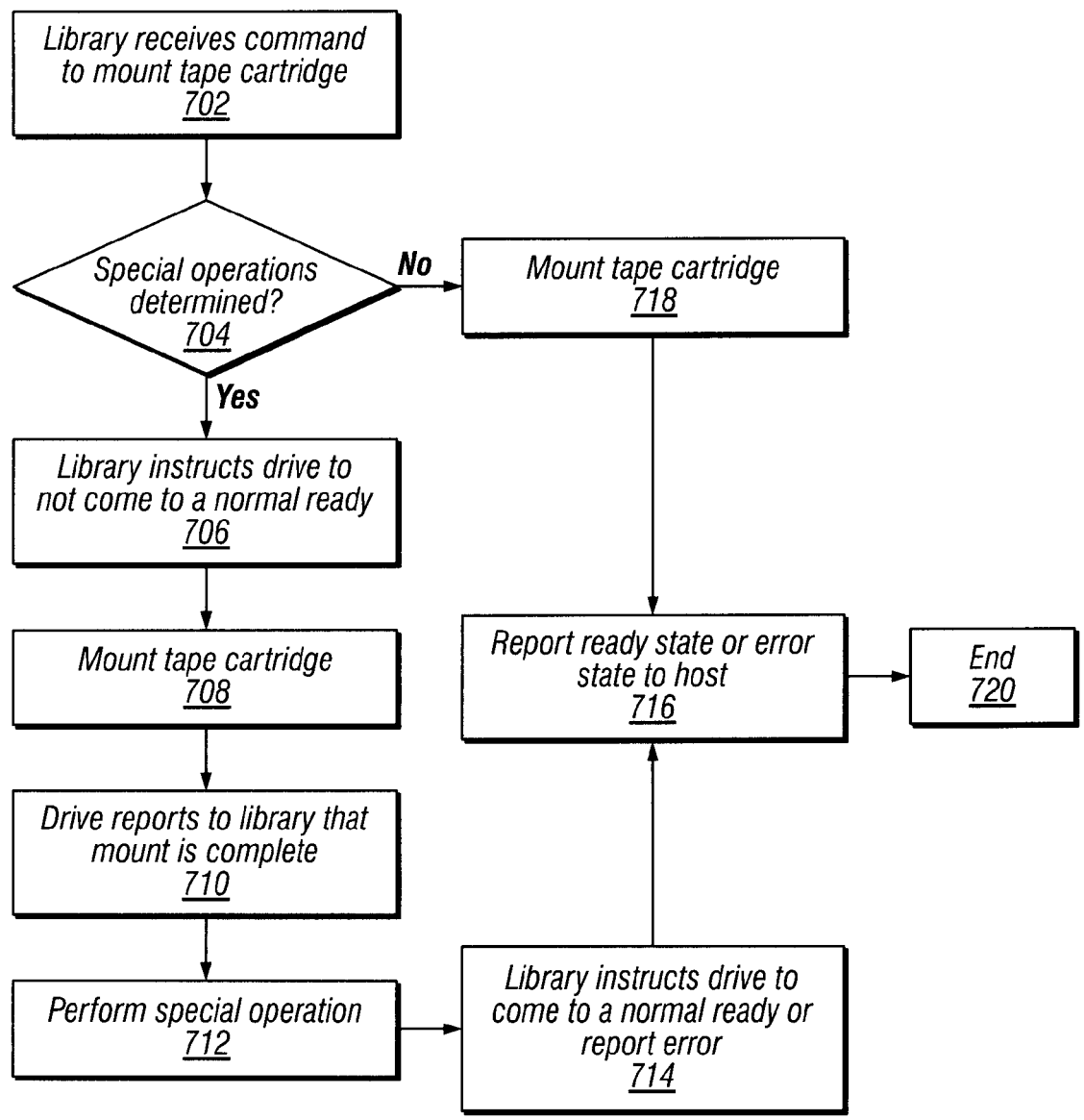
FIG. 7 is a logical flowchart of the steps target of opportunity when target of opportunity is recognized by the tape library during a tape mount.

FIG. 7 illustrates an embodiment in which the automated data storage library 10 acts as the controlling agent and recognizes that target of opportunity may be used while a tape cartridge (e.g. tape or data storage cartridge 600) is mounted within a tape drive (e.g. tape or data storage drive 15). In step 702 the automated data storage library 10 receives the command to mount a tape cartridge (e.g. data storage cartridge 600). The command to mount a tape cartridge may be issued by a host 40, 41 or 42 to the automated data storage library 10 in response to a request for an operation that requires a tape cartridge mount (e.g. a read and/or write request). In response to the command to mount the tape cartridge 600, the automated data storage library 10 determines in step 704 if there is at least one special operation that may be performed that would require little, if any, additional resources and/or time while the tape cartridge 600 is mounted.

The automated data storage library 10 may determine whether or not at least one special operation may be performed based on evaluating parameters against predetermined criteria, in the manner explained above. The parameters may be the amount of time that has transpired or the number of times the tape cartridge has been mounted since the most recent identical special operation was performed. For example, the parameters may be the amount of time that has transpired or the number of times the tape cartridge has been mounted since the most recent refresh of the tape cartridge, the most recent media check, the most recent servo format integrity check, or the most recent other media diagnostic of the tape cartridge 600. In addition, the parameters may be the time that has transpired or the number of times the tape cartridge has been mounted since the most recent rekey operation, key retirement operation, or key migration operation, etc.

If in step 704 it is determined by the automated data storage library 10 that no special operation exists then the process continues to step 718. In step 718, the automated data storage library 10 and the accessor 18 or 28 move the tape cartridge 600 and mount the tape cartridge 600 in the data storage drive 15. In step 716 the data storage drive 15 reports a ready state or an error state to the host and the process ends at step 720. It should be noted that in general a ready state will be returned, however, an error state may occur when a diagnostic or operation encounters failure conditions, or detects severely degraded media.

Alternatively, if it is determined that there is a special operation to be performed, the automated data storage library 10 instructs the data storage drive 15, to not come to a normal ready or to hold off the ready status (step 706). In response, the data storage drive 15 will not perform the normal ready state transition to the host 40, 41, or 42 as it would when the data storage drive 15 is in a normal ready state. Rather, the data storage drive 15 will notify the host 40, 41, or 42 that it is in a not ready state. The data storage drive 15 may notify the automated data storage library 10 of its pseudo-ready state (e.g. being ready to perform the special operation, while appearing to be in an not ready state to the host) so that the special operation(s) may be performed before the host 40, 41, or 42 is able to access the storage media 611 of the tape cartridge 600.

In step 708 the automated data storage library 10 and/or the accessor 18 or 28 move the tape cartridge 600 and mount the tape cartridge 600 in the data storage drive 15. Upon mounting the tape cartridge 600, the data storage drive 15 reports to the automated data storage library 10 that the mount is complete (step 710). In step 710 the data storage drive 15 does not report to the host 40, 41, or 42 that the mount is complete, and therefore, the special operation may be performed transparently to the host 40, 41, or 42. Upon receiving the mount complete notification the automated data storage library 10 instructs the data storage drive 15 to perform the special operation. In response, the data storage drive 15 performs the special operation (step 712).

In step 714, once the special operation is completed, the automated data storage library 10 instructs the data storage drive 15 to come to a normal ready or report an error. In response, the data storage drive 15 reports a ready state or an error state to the host (step 716) and the process ends at step 720.

The operation that required a tape cartridge mount (e.g. a read and/or write request) and, thus originally initiated the command to mount the tape cartridge 600, (step 702) may be performed during the process described in FIG. 7. For example, the operation, such as a read and/or write, may be performed any time after the tape cartridge 600 is mounted (step 708) and before the tape cartridge 600 is demounted.

In the above described process, in the case where the automated data storage library 10 determines that a special operation may be performed, the tape cartridge 600 may only be mounted and demounted once to perform both the tasks of reading and/or writing and the at least one special operation. For example, in the case where the special operation is a refresh operation, in the above described process the tape cartridge 600 would be mounted only once to perform a read and/or write as well as the refresh operation where the tape media 611 is physically unspooled and respooled in one continuous, smooth motion.

In contrast, the previous methods, would require the tape cartridge 600 to be mounted, the tape media 611 wound to the correct location for the read and/or write, and the tape cartridge 600 demounted to finish the read and/or write task. The tape cartridge 600 would also be mounted for the refresh operation in which the tape media 611 is physically unspooled and respooled in one continuous, smooth motion.

In another embodiment, the automated data storage library 10 may be configured to send a command to the data storage drive 15 to defer the ready or not come to a normal ready, then query the data storage drive 15 for information (e.g. at least one parameter) which is stored on the tape cartridge 600 to determine if a special operation may be performed. This alternative embodiment would the follow similar steps as described with respect to FIG. 7. For example, in response to querying the data storage drive 15 for information (e.g. at least one parameter) stored on the tape cartridge 300, the automated data storage library 10 and/or the accessor 18 or 28 move the tape cartridge 600 and mount the tape cartridge in the data storage drive 15 (step 708). Upon mounting the tape cartridge 600, the data storage drive 15 reports to the automated data storage library 10 that the mount is complete (step 710). The data storage drive 15 also reports to the automated data storage library 10 the information (e.g. the parameters) requested in the query. Based on the information reported to the automated data storage library 10, the automated data storage library 10 may then determine whether to perform a special operation or simply release the ready status of the data storage drive 15 immediately.

If it is determined that a special operation should be performed the automated data storage library 10 instructs the data storage drive 15 to perform the special operation. In response, the data storage drive 15 performs the special operation (step 712). In step 714, once the special operation is completed the automated data storage library 10 instructs the data storage drive 15 to come to a normal ready or report an error. In response, the data storage drive 15 reports a ready state or an error state to the host (step 716) and the process ends at step 720.

Each of the blocks of the flow diagram of FIG. 7, and those depicted in subsequent figures, may be executed by a module (e.g. a software module) or a portion of a module or a computer system user. The methods described herein, the operations thereof and modules for performing such methods may therefore be executed on a computer system configured to execute the operations of the method and/or may be executed from computer-readable media. The method may be embodied in a machine-readable and/or computer-readable medium for configuring a computer system to execute the method. The software modules may be stored within and/or transmitted to a computer system memory to configure the computer system to perform the functions of the module. Alternatively, such actions may be embodied in the structure of circuitry that implements such functionality, such as the micro-code of a complex instruction set computer (CISC), firmware programmed into programmable or erasable/programmable devices, the configuration of a field-programmable gate array (FPGA), the design of a gate array or full-custom application-specific integrated circuit (ASIC), or the like.

Those skilled in the art will also recognize that the boundaries between modules and operations depicted herein are merely illustrative and alternative embodiments may merge such modules or operations, or impose an alternative decomposition of functionality thereon. For example, the actions discussed herein may be decomposed into sub-operations to be executed as multiple computer processes. Moreover, alternative embodiments may combine multiple instances of a particular operation or sub-operation. Furthermore, those skilled in the art will recognize that the operations described in exemplary embodiment are for illustration only. Operations may be combined or the functionality of the operations may be distributed in additional operations in accordance with the invention.

Figure 8:
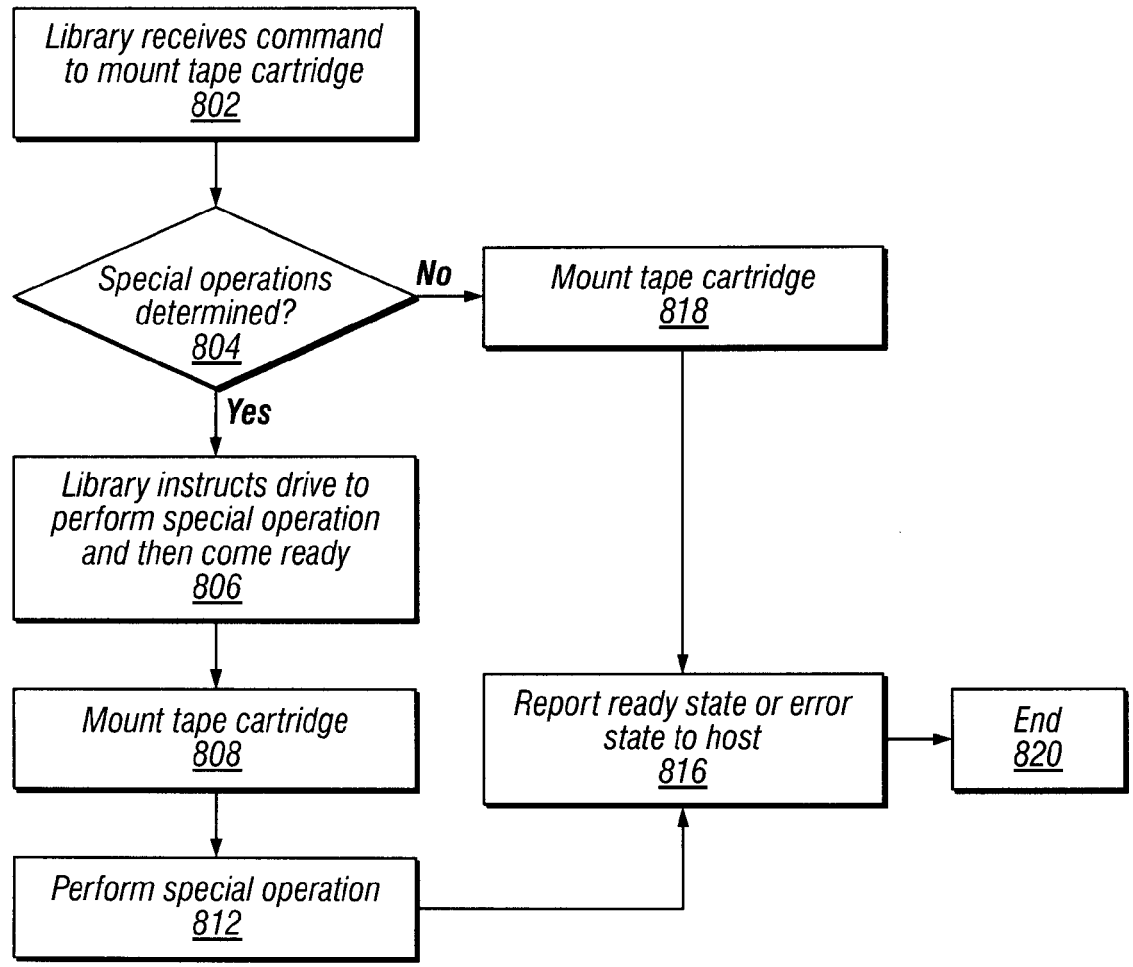
FIG. 8 is a logical flowchart of the alternative steps of target of opportunity when target of opportunity is recognized by the tape library during a tape mount.

FIG. 8 describes another embodiment in which the automated data storage library 10 recognizes that target of opportunity may be while a tape cartridge (e.g. data storage cartridge 600) is mounted in a tape drive (e.g. data storage drive 15). In the embodiment illustrated in FIG. 8, rather than instructing the data storage drive 15 to hold off the ready (as performed in the embodiment represented by FIG. 7), the automated data storage library 10 instructs the data storage drive 15 to perform the special operation and then come to a ready status.

Turning to FIG. 8, in step 802 the automated data storage library 10 receives the command to mount a tape cartridge (e.g. data storage cartridge 600). The command to mount a tape cartridge may be issued by a host 40, 41, or 42 to the automated data storage library 10 in response to a request for an operation that requires a tape mount (e.g. a read and/or write request). In response to the command to mount the tape cartridge 600, the automated data storage library 10 determines in step 804 if there are special operations that may be performed.

If in step 804 it is determined by the automated data storage library 10 that no special operation exists then the process continues to step 818. In step 818, the automated data storage library 10 and the accessor 18 or 28 move the tape cartridge 600 and mount the tape cartridge 600 in the data storage drive 15. In step 816 the data storage drive 15 reports a ready state or an error state to the host and the process ends at step 820.

Alternatively, if it is determined that there is at least one special operation to perform, in step 806, the automated data storage library 10 instructs the data storage drive 15 to perform the determined special operations and then come to a ready status when the special operations are complete. In response, the data storage drive 15 will not perform the normal ready state transition to the host 40, 41, or 42 as it would when the data storage drive 15 is at the normal ready state. Rather, the data storage drive 15 will notify the host 40, 41, or 42 that it is in a not ready state. The data storage drive 15 may notify the automated data storage library 10 of its pseudo-ready state (e.g. being ready to perform the special operation, while appearing to be in an not ready state to the host) so that the special operation(s) may be performed before the host 40, 41, or 42 is able to access the storage media 611 of the tape cartridge 600.

In step 808 the automated data storage library 10 and the accessor 18 or 28 move the tape cartridge 600 and mount the tape cartridge in the data storage drive 15. In response to the automated data storage library 10 instructing the data storage drive 15 to perform the special operation of step 806, the data storage drive 15 performs the special operation in step 812.

Once the special operation is completed the data storage drive 15 reports a ready state or an error state to the host (step 816) and the process ends at step 720.

The operation that required a tape cartridge mount (e.g. a read and/or write request) and, thus originally initiated the command to mount the tape cartridge 600, (step 802) may be performed during the process described in FIG. 8. For example, the operation, such as a read and/or write, may be performed any time after the tape cartridge 600 is mounted (step 808) and before the tape cartridge 600 is demounted.

As explained with respect to FIG. 7, in the case where the automated data storage library 10 determines that a special operation may be performed, the tape cartridge 600 may only be mounted and demounted once to perform both the tasks of reading and/or writing and the at least one special operation. For example, in the case where the special operation is a refresh operation, in the above described process the tape cartridge 600 would be mounted only once to perform a read and/or write as well as the refresh operation where the tape media 611 is physically unspooled and respooled in one continuous, smooth motion.

In contrast, the previous methods, would require the tape cartridge 600 to be mounted, the tape media 611 wound to the correct location for the read and/or write, and the tape cartridge 600 demounted to finish the read and/or write task. The tape cartridge 600 would also be mounted for the refresh operation in which the tape media 611 is physically unspooled and respooled in one continuous, smooth motion.

Figure 9:
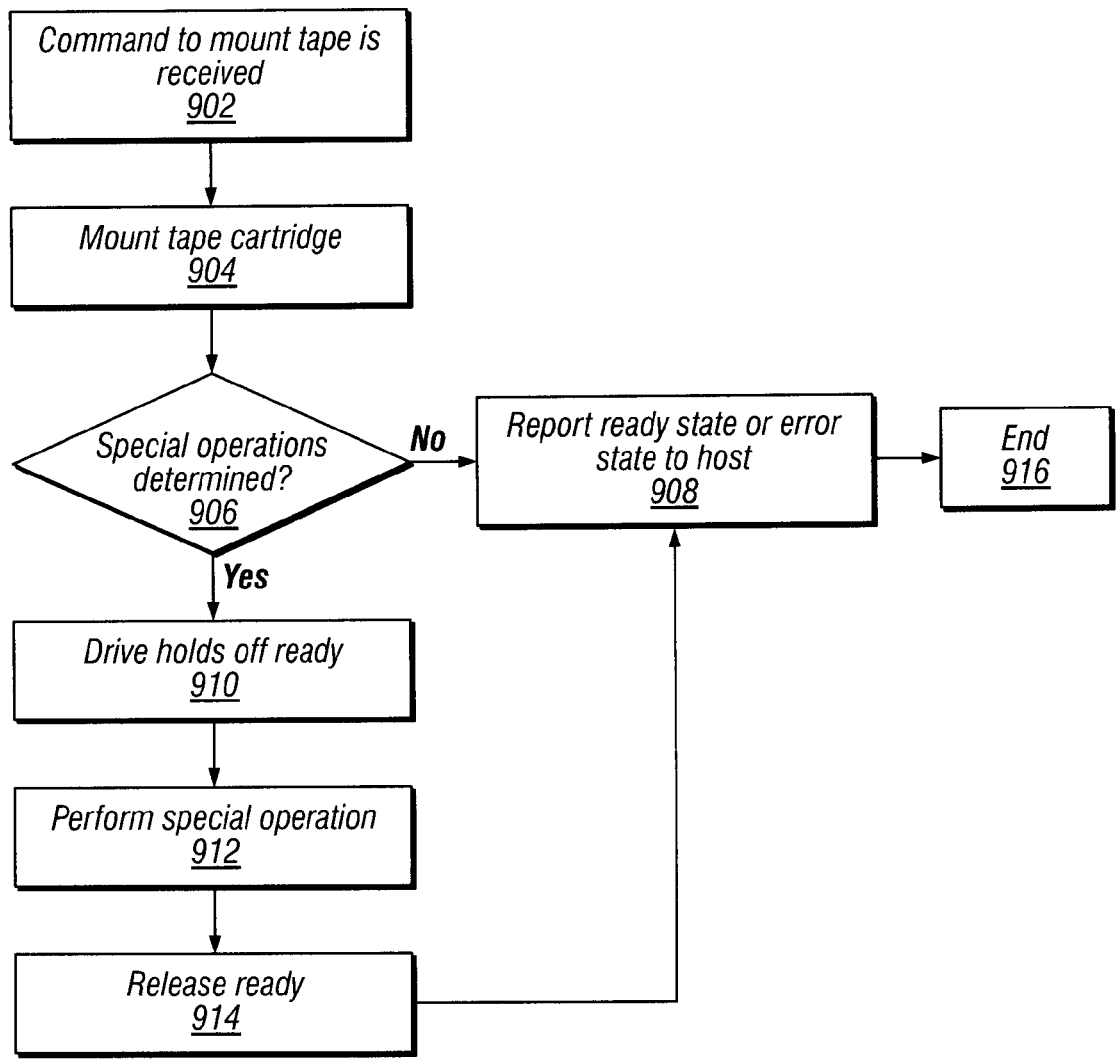
FIG. 9 illustrates a logical flowchart of the steps of target of opportunity when target of opportunity is recognized by the tape drive during a tape mount.

FIG. 9 illustrates an embodiment in which the data storage drive 15 recognizes that target of opportunity may be used while a tape cartridge (e.g. data storage cartridge 600) is mounted in a tape drive (e.g. data storage drive 15). Beginning at step 902 the data storage drive 15 receives the command to mount a tape cartridge (e.g. data storage cartridge 600). The command to mount a tape cartridge may be issued by a host 40, 41, or 42 or the automated data storage library 10 in response to a request for an operation that requires a tape mount (e.g. a read and/or write request). In response to the command to mount the tape cartridge 600, the accessor 18 or 28 of automated data storage library 10 moves the tape cartridge 600 and mounts the tape cartridge 600 in the data storage drive 15 (step 904).

In step 906, the data storage drive 15 determines if there are special operations that may be performed. The data storage drive 15 may determine whether or not a special operation may be performed based on evaluating the parameters against predetermined criteria as discussed above.

If in step 906 no special operation is determined by the data storage drive 15 then the process continues to step 908, In step 908 the data storage drive 15 reports a ready state or an error state to the host 40, 41, or 42 and the process ends at step 916.

Alternatively, if it is determined in step 906 that there is a special operation to perform, then in step 910 the data storage drive 15 does not come to a normal ready or holds off a ready status (e.g. the data storage drive 15 will not perform the normal ready state transition and does not inform the host 40, 41, or 42 of it ready status upon mounting the tape cartridge 600 as it would usually when the data storage drive 15 and the data storage cartridge 600 is at the normal ready state). The data storage drive 15 may notify the host 40, 41, or 42 that it is in a not ready state.

In step 912 the data storage drive 15 performs the special operation. The special operations may be a tape refresh, a media check, a servo format integrity check, or other media diagnostic of the tape cartridge 600.

In step 914, once the special operation is completed the data storage drive 15 reports a ready state or an error state to the host 40, 41, or 42 (step 908) and the process ends at step 916.

The operation that required a tape cartridge mount (e.g. a read and/or write request) and, thus originally initiated the command to mount the tape cartridge 600, (step 902) may be performed during the process described in FIG. 9. For example, the operation, such as a read and/or write, may be performed any time after the tape cartridge 600 is mounted (step 904) and before the tape cartridge 600 is demounted.

As explained with respect to FIG. 7 and FIG. 8, in the case where the data storage drive 15 determines that a special operation may be performed, the tape cartridge 600 may only be mounted and demounted once to perform both the tasks of reading and/or writing and the at least one special operation. For example, in the case where the special operation is a refresh operation, in the above described process the tape cartridge 600 would be mounted only once to perform a read and/or write as well as the refresh operation where the tape media 611 is physically unspooled and respooled in one continuous, smooth motion.

In contrast, the previous methods, would require the tape cartridge 600 to be mounted, the tape media 611 wound to the correct location for the read and/or write, and the tape cartridge 600 demounted to finish the read and/or write task. The tape cartridge 600 would also be mounted for the refresh operation in which the tape media 611 is physically unspooled and respooled in one continuous, smooth motion.

Further, in an alternative embodiment, previous checks, diagnostics, or verifications may be used to alter the interval for monitoring. Still further, if a particular tape cartridge 600 was flagged because a check, diagnostic, or verification determined the tape cartridge 600 may have a problem, the same test may be performed by a different data storage drive 15 to further isolate the problem and determine if the problem is related to the data storage drive 15, the tape media 611, or the interaction between the data storage drive 15 and the tape media 611.

In yet another embodiment, target of opportunity may be applied to an encryption process. In many applications, it is important to ensure that data stored on removable media is secure. In addition to the inconvenience and expense of having to replicate, reconstruct or re-obtain data lost to theft, accidents, etc. there can be tremendous fallout, including legal liability, if confidential information is misappropriated. IBM® has developed a method and a system for encrypting data on removable media. Encryption may be described as the transformation of data into a form, called a cipher text, using an encryption key that cannot be easily transformed back to the original data without the decryption key. Decryption may be described as the process of transforming the encrypted data back into its original form using a decryption key.

Figure 10:
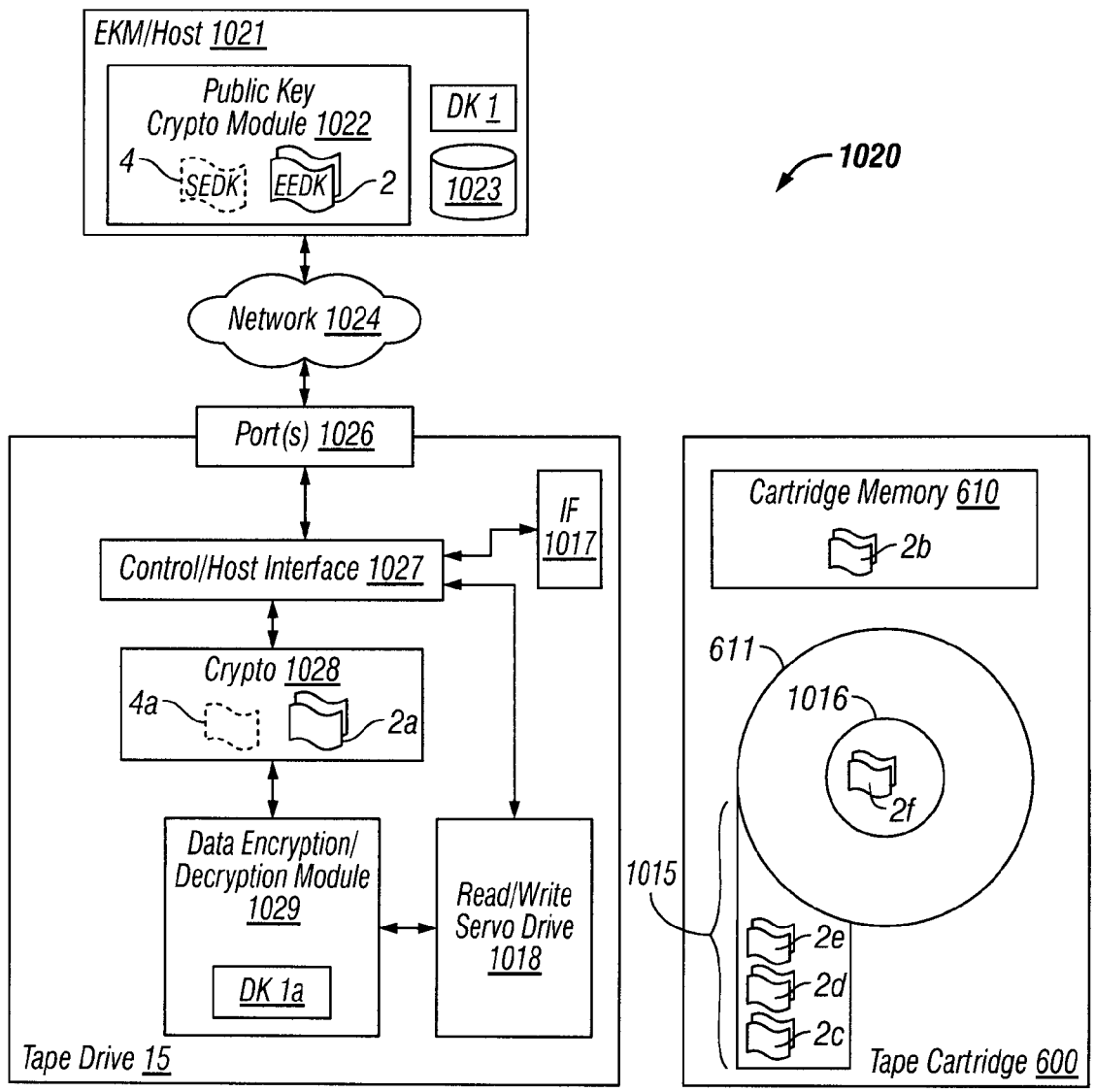
FIG. 10 is a generalized block diagram of a computing environment in which a tape cartridge and a tape drive are implemented.

Referring to FIG. 10, a computing environment is illustrated in which the tape cartridge 600 and tape drive 15 are implemented in combination with an external key manager (EKM) 1021 as a cartridge handling system 1020. It will be appreciated that the external key manager 1021 may be a host computer, such as 40, 41, or 42 (acting alone or in combination with a proxy control unit), a key management appliance (acting alone or in combination with a proxy library), or the like. One example implementation of such a cartridge handling system 1020 would be a magnetic tape data storage system formed from the combination of an IBM 3592 Model E05 Encrypting Tape Drive and the IBM 3592 Enterprise Tape Cartridge subsystem.

In the illustrated example, the EKM/host system 1021 includes a host application (not shown), such as a backup program, that transfers data to the tape drive 15 to sequentially write to the tape cartridge 600, such as by using the Small Computer System Interface (SCSI) tape commands to communicate I/O requests to the tape drive 15, or any other data access command protocol known in the art.

As will be appreciated, the EKM/host system 1021 may be constructed from one or more servers (e.g. the EKM may reside on one server and any application which is reading and writing data to the tape drive 15 may reside on another server). However implemented, the EKM/host 1021 includes a data key generator functionality for generating a data key (DK) 1 for use in performing data encryption, though this functionality may also be provided in the tape drive 15 or even externally to the system 1020. The EKM/host 1021 also includes a public key crypto module 1022 that is used to form a session encrypted data key (SEDK) 4 from the data key 1, and then to securely pass the SEDK 4 to the tape drive 15 as part of a secure key exchange. The public key crypto module 1022 also securely encrypts the data key 1 to form one or more encryption encapsulated data keys (EEDK) 2 (as indicated by the stacked keys). In various embodiments, the public key crypto module 1022 uses a predetermined public key encryption technique (such as RSA or ECC) to generate EEDK(s) 2 from DK(s) 1. For example, the public part of a public/private key pair that is retrieved from a key store 1023 (which may or may not reside locally with EKM/host 1021) may be used to wrap the data key 1 into its encrypted EEDK form. The encrypted EEDK form includes not only the encrypted data key DK 1 itself, but also other structural information, such as a key label or key hash, which identifies the public/private key pair that is used to wrap the data key 1. Once a public key from the key store 1023 is used to generate an EEDK, the identifying structural information in the EEDK 2 can be later used by the key module 1022 or EKM 1021 as an index or reference to the public/private key pair in the key store 1023 to retrieve the private key from the key store 1023 when the EEDK 2 needs to be processed to unwrap the DK 1.

The tape drive 15 may connect with the EKM/host 1021 through a direct interface (such as an SCSI, Fibre Channel (FCP), etc., in the case if the tape drive 15 is connected to the EKM/host 1021) or may connect over a data channel or network 1024 (such as a Local Area Network (LAN), Storage Area Network (SAN), Wide Area Network (WAN), the Internet, an Intranet, etc.). It will be appreciated that the tape drive 15 may be enclosed within the EKM/host system 1021 or may be a standalone unit or in the automated data storage library 10.

In addition, a read/write servo drive system 1018 is provided for reading information from, and writing information to, the rewritable storage media 611. The read/write servo drive system 1018 controls the movement of a servo head (not shown) relative to the rewritable storage media 611 by moving the rewritable storage medium 611 across the servo head at a desired velocity, and stops, starts and reverses the direction of movement of the magnetic tape.

A drive control system 1027 in the tape drive 15 communicates with the memory interface 1017 and the read/write system servo drive 1018. To receive commands and exchange information for operating the cartridge handling system 1020, the drive controller 1027 also acts as a host interface to communicate over one or more ports 1026 with one or more external key management (EKM) subsystems 1021 (such as a host computer, library or external key management appliance).

A crypto module 1028 and data encryption/decryption module 1029 are provided in the tape drive 15 for securely encrypting and storing data to the tape cartridge 600 and for securely retrieving and decrypting data stored on the tape cartridge 600. In operation, the data encryption/decryption module 1029 performs the actual data encryption and decryption (such as by using the Advanced Encryption Standard encryption algorithm) using a data key having any desired key length (e.g. 128 or 256-bit data key length), and may also perform other encoding functions, such as data compression and decompression and data buffering.

The crypto module 1028 controls the data encryption/decryption module 1029 by securely exchanging data keys (DKs) 1 using the session encrypted data key (SEDK) 4a which is received from the EKM 1021 (where it is originally generated as SEDK 4). At the crypto module 1028, the data key 1a is extracted from the SEDK 4a, and is sent to the data encryption/decryption module 1029 where it is used to encode/decode the input data stream. In addition, the crypto module 1028 assembles, validates, distributes, stores and retrieves one or more associated encryption encapsulated data keys (EEDKs) 2a (where the letter suffix "a" in the reference numeral indicates that the EEDKs 2 and 2a are logically identical, though physically distinct copies). While the modules 1028, 1029 may be implemented with any desired combination of hardware and/or software, the data encryption/decryption module 1029 may be implemented with an ASIC or FPGA circuit, while the crypto module 1028 may be implemented with one or more drive firmware modules that include a microprocessor and microcode stored in a code memory.

As described herein, the cartridge handling system 1020 performs a variety of functions, including but not limited to, encrypting data to be stored on the cartridge 600 using a data key (such as an AES encryption key); using public key cryptography techniques to wrap the data key with a different key to form one or more encrypted data keys; writing and reading the encrypted data and encrypted data key(s) to and from the tape cartridge media; and decrypting the stored encrypted data with the data key that is obtained by unwrapping the encrypted data key. In this way, the cartridge handling system 1020 provides a distributed key store which permits different users to access the encrypted data on a single tape cartridge 600 by generating separate EEDKs using each user's public key to wrap the data key 1.

In one example of creating a distributed key store at least a first EEDK 2 is generated for local use by using a public key of the local key manager to wrap the data key 1. The EEDK 2 is then transferred via the tape drive 15 (where it may be temporarily stored as 2*a*) for storage on the tape cartridge 600 at one or more predetermined locations, as indicated at 2*b*, 2*c*, 2*d*, 2*e* and 2*f*. As a result, the transferred EEDK 2 may be stored in the cartridge memory 610 and/or one or more non-user data areas of the tape media 611, such as a user read area 1015 or an end of tape area 1016. Though a single copy of the EEDK may be stored on the tape cartridge 600, security and reliability are enhanced by using one or more non-user areas 1015, 1016 of the tape media 611 to store multiple (e.g. three or more) copies of the EEDK 2, thereby allowing deletion of the EEDKs 2, 2*a* at the EKM 1021 and tape drive 15. Since the only non-volatile copies of the EEDKs are stored within the tape cartridge 600, multiple copies of the EEDKs (2*b*, 2*c*, etc) provides multiple ways to access the EEDKs and thus the data key 1 in the cases where one or more copies of the EEDKs cannot be read or otherwise processed due to errors or degraded media or drive conditions.

When a plurality of EEDKs 2 are generated from a single data key 1—such as when a second EEDK is generated for a remote user (e.g. a business partner) by using a public key of the remote user to wrap the data key 1—the plurality of EEDKs 2 are transferred via the tape drive 15 for storage on the tape cartridge 600 at one or more locations (as indicated by the copies of the EEDKs 2*b-f* that are stored in one or more non-user data areas 1015, 1016 of the tape media 611 and/or the cartridge memory 610). By storing multiple EEDKs on the tape cartridge 600 in specially designated locations (such as the cartridge memory 610 or outside of the tape's user data area), the tape cartridge 600 can have one EEDK wrapped for local use and another for remote exchange. In theory, any number of different EEDKs could be stored, provided there is storage space for them.

To illustrate how data may be securely encoded and stored on a removable tape cartridge that has not previously acquired its own encrypted data keys, reference is now made to the process flow depicted in FIG. 11 and the cartridge handling system 1020 depicted in FIG. 10. When a request is received to encode and store data on the tape cartridge 600 (step 1130), a DK 1 is generated at the EKM 1021 (step 1131) and is then made available in encrypted form to the tape drive 15 before the write process begins. To this end, a secure key exchange is used to transfer the DK 1 in encrypted form to the tape drive 15 for purposes of enabling the tape drive encryption process.

While a variety of different encryption techniques may be used, an initial key generation process at the EKM 1021 encrypts the DK 1 to form one or more EEDK(s) 2 using an encryption method, such as a pubic key cryptographic method (step 1132). It is unimportant whether the encryption method is known outside of the EKM 1021. In a selected embodiment, the EEDK creation process in the EKM 1021 uses asymmetric encryption by performing RSA 2048-bit encryption of the DK 1 with the public part of a public/private key pair to render the data key 1 within the EEDK 2 completely secure to any entity who does not possess the private part of the key pair. To associate the generated EEDK(s) 2 with the public/private key pair used to encrypt the DK 1, structural information about the public/private key pair is included in each generated EEDK by the EKM 1021 which can be extracted from the EEDK for future access to the data key and consequently the encrypted data itself.

At this time, a secure key exchange is established to encrypt the data key DK 1 with a session key (e.g. the public key from the tape drive 15), thereby generating a session encrypted data key 4 (SEDK) (step 1133) which can be securely passed, along with the EEDK(s) 2, to the tape drive 15. Once the EKM 1021 sends the encrypted data keys to the tape drive 15, the data key 1 and encrypted data key(s) 2, 4 may be discarded by the EKM 1021 (step 1134). As will be appreciated, there are several methodologies which may be used for secure key exchanges, including wrapping the data key 1 in a session key, though other techniques may be used, including but not limited to RSA, Diffie-Hellman (DH), elliptic curve Diffie Hellman (ECDH), Digital Signature Algorithm (DSA), elliptic curve DSA (ECDSA), etc. The session key may come from the tape drive 15 or the host 40, 41, or 42.

Upon transfer to the tape drive 15, the EEDK(s) 2*a* and the SEDK 4*a* are stored in the crypto module 1028. The tape drive 15 decrypts the SEDK 4*a* with its private session key to produce the data key 1*a* which is used to set up the encryption hardware module 1029. At any point after the encryption hardware module 1029 is set up, the SEDK 4*a* may be discarded from the tape drive 15 (step 1135). The tape drive 15 also writes the EEDK(s) 2*a* to the tape cartridge 600 as part of set up or any point thereafter, and begins encrypting data using the extracted data key 1*a*. When writing the EEDKs 2*a* to the tape cartridge 600, the tape drive 15 stores multiple copies of the EEDK 2*b-2f* in a plurality of locations, such as one or more non-user data areas 1015, 1016 of tape media 611 and in the cartridge memory 610 (step 1136).

In selected embodiments, the EEDKs are written to the tape cartridge 600 before the encoding or writing of data since such writing may comprise many gigabytes. Also, by recording the EEDKs first, the host system that encounters an error condition can retrieve some portion of the written encoded data by using the previously stored EEDK for that encoded data. While the EEDKs 2*a* could be discarded from the tape drive 15 after being written to the tape cartridge 600, they may be retained in the tape drive 15 in a volatile fashion for as long as the tape cartridge 600 is loaded in the tape drive 15. Once the input data stream is encrypted and the tape drive 15 has written the encoded data to the tape media 611, the tape drive 15 discards the data key 1*a* (step 1135). Once the encoded data and EEDK(s) 2*b-2f* are stored to the tape cartridge 600, the tape drive 15 discards the encoded data and the EEDK(s) 2*a* (step 1136).

An example of how data may be securely decoded and read from a removable tape cartridge will now be described with reference to the process flow depicted in FIG. 12 and the cartridge handling system 1020 depicted in FIG. 10. During the tape cartridge load process, the tape drive 15 recognizes that a tape media 1611 has encryption data on it by detecting the existence of EEDKs or other control indicators on the tape cartridge 600 (step 1240). This may be done at the tape drive 15 by reading the EEDK(s) 2*b* from cartridge memory 610 and/or by reading and verifying the EEDK(s) 2*c-2f* from a non-user data area(s) 1015, 1016 of tape media 611.

To enable the tape device hardware decryption and/or encryption process(es), a key exchange must occur in order to retrieve and decrypt the stored EEDKs 2*b-f* for purposes of extracting the correct decryption data key. However, when the data keys are not retained or stored on the tape drive 15 or the EKM 1021, the EEDKs 2*b-f* must be used to reacquire the data key 1 at the EKM 1021 which is then securely transferred to the tape drive 15. For example, after the tape cartridge 600 is loaded and the EEDKs 2b-f are stored as EEDKs 2a in the crypto module 1028 of the tape drive 15, the tape drive 15 sends the EEDKs 2a to the EKM 1021 (step 1241), either in response to a request from the EKM 1021 (or automatically in the case of a library/appliance model).

Once the EEDKs 2 are transferred to the EKM 1021, the EKM 1021 determines their validity and decrypts the EEDKs 2 by extracting structural information from each EEDK and searching the key store 1023 for a match, in which case the associated private key is output from the key store 1023 and used to decrypt the EEDK, thereby extracting the data key DK 1 (step 1242). The data key DK 1 is then securely wrapped in the driver's session key to generate the session encrypted data key SEDK 4 (step 1243). Using any desired secure key exchange protocol, the EKM 1021 passes the SEDK 4 to the tape drive 15 where it is stored as the SEDK 4a, at which time the EKM 1021 discards the SEDK 4 (step 1244). The tape drive 15 then decrypts the SEDK 4a with its private session key to produce the data key 1a which is used to setup the decryption hardware module 1029 (step 1245). Again, the tape drive 15 can discard the SEDK 4a at any point after the decryption hardware module 1029 is setup, even before the stored data is decrypted.

Figure 13:
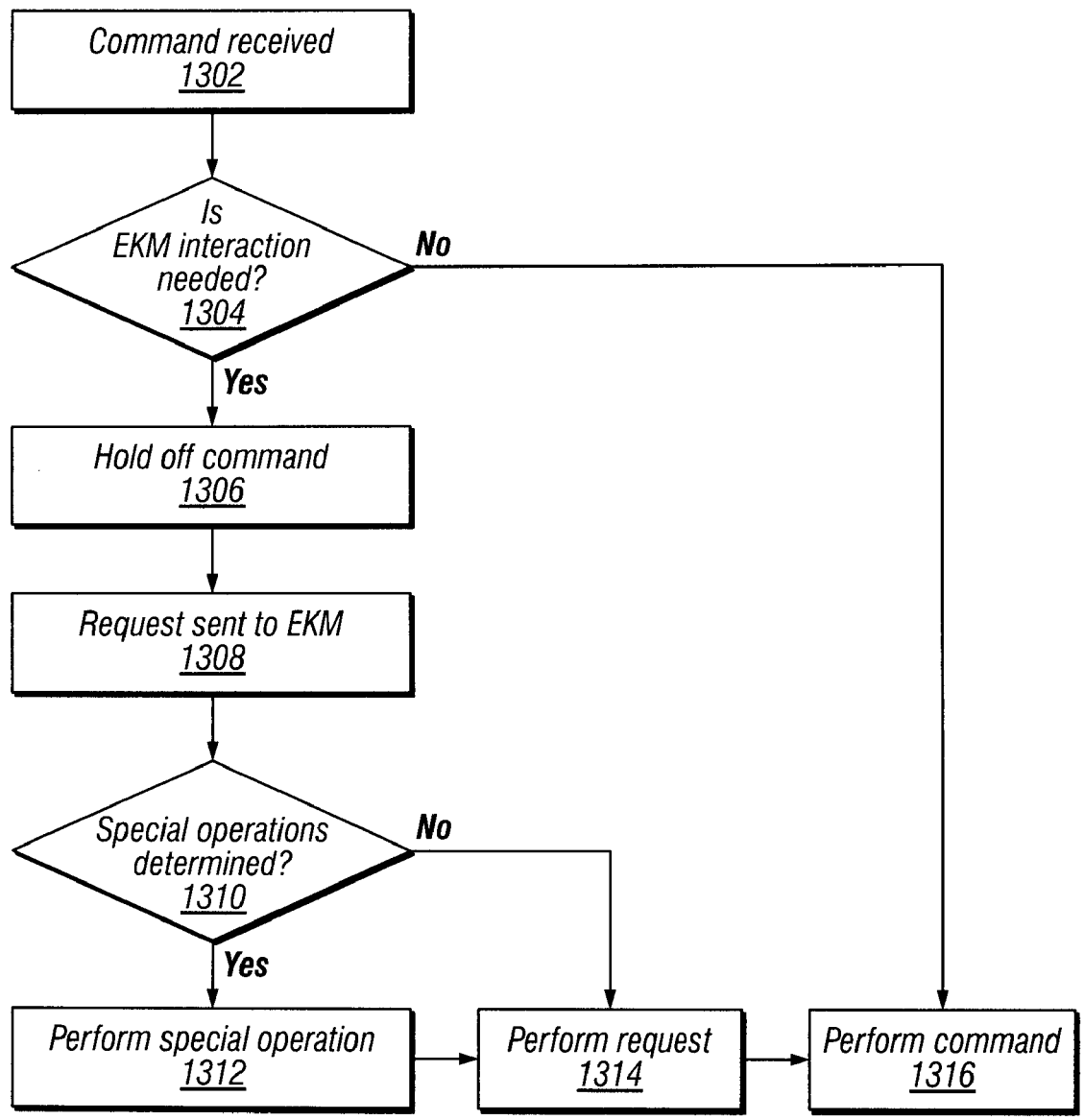
FIG. 13 illustrates a logical flowchart of the steps used for target of opportunity during an encryption process.

FIG. 13 illustrates an embodiment in which the encryption key manager (EKM) 1021 recognizes that target of opportunity may be used while a session with the EKM 1021 is open. Beginning at step 1302 the data storage drive 15 receives a command. The command may be a command to read and/write to a tape cartridge (e.g. data storage cartridge 600). In response to the command to read and/or write to the tape cartridge, an additional command to mount the tape cartridge 600 may be issued by a host 40, 41, or 42 or the automated data storage library 10. In response to the additional command to mount the tape cartridge 600, the accessor 18 or 28 of automated data storage library 10 moves the tape cartridge 600 and mounts the tape cartridge 600 in the data storage drive 15 (not shown).

In step 1304, the tape drive 15 determines if there is EKM 1021 interaction needed in order to perform the command issued in step 1302. During the tape cartridge load process, the tape drive 15 may recognize that a tape media 10 has encrypted data stored thereon by detecting the existence of EEDKs or other control indicators on the tape cartridge 600 (step 1240). This may be accomplished by the tape drive 15 by reading the EEDK(s) 2b from cartridge memory 610 and/or by reading and verifying the EEDK(s) 2c-2f from a non-user data area(s) 1015, 1016 of tape media 611. For example, EKM interaction may be required when reading from or writing to an encrypted data storage cartridge, or when the command requires rekeying an encrypted data storage cartridge.

If it is determined that no EKM 1021 interaction is needed then the tape drive 15 performs the command (in step 1316) that was issued in step 1302.

If it is determined that EKM 1021 interaction is needed then the tape drive 15 holds off the command in step 1306 (e.g. prevents the command from being performed at that time). The tape drive 15 sends a request to the EKM in step 1308. For example, in the case where the command issued in 1302 was a read request to read an encrypted data storage cartridge 600, the request of step 1308 may be a request for the key to enable reading of the data storage cartridge 600 (e.g. by the decryption process described in FIG. 12). Similarly, in the case where the command issued in 1302 was a request to write to an encrypted data storage cartridge 600, the request of step 1308 may be a request for the key to enable writing to the data storage cartridge 600 (e.g. by the encryption process described in FIG. 11).

In step 1310, the EKM 1021 determines if there are special operations that may be performed. The EKM 1021 may determine whether or not a special operation may be performed based on evaluating the parameters against predetermined criteria. The parameters may be stored and associated with the drive identifier, the cartridge volser, or the keys that are currently being used. The parameters may be stored in any location that the EKM 1021 may access. For example, the parameters may be stored in the data storage drive 15, the automated data storage library 10, or the EKM 1021.

The parameters may include the time that has transpired or the number of times the tape cartridge has been mounted since the most recent identical special operation was performed. For example, the parameters may be the time that has transpired or the number of times the tape cartridge has been mounted since the most recent rekey operation, key retirement operation, or key migration operation, etc.

The parameters may be evaluated against predetermined criteria which may be defined by a user. For example, to determine if a special operation such as a rekey may be performed, the number of mounts since the most recent rekey may be compared or evaluated against the predetermined maximum threshold number of mounts for a rekey. If the number of mounts since the most recent rekey is greater than the predetermined maximum threshold number of mounts then it may be determined a special operation of a rekey may be performed and a target of opportunity is recognized.

Similarly, to determine if a special operation such as a rekey may be performed, the amount of time transpired since the most recent rekey may be compared or evaluated against the predetermined maximum threshold of time transpired. If the amount of time transpired since the most recent rekey is greater than the predetermined maximum threshold of time transpired then it may be determined a special operation of a rekey may be performed and a target of opportunity is recognized.

It is important to note that keys may have time limits or expiration dates associated with them. These expiration dates may be defined by a user and may be used as predetermined criteria for a rekey process in one embodiment. A key is said to be expired when it reaches beyond the defined time limit (e.g. expiration date), without a rekey operation being performed. A rekey operation may then be performed once the key is expired or proactively before the key is expired.

The predetermined maximum threshold number of mounts for a rekey may be defined as the maximum number of mounts that are expected to not cause errors in obtaining the key, and consequently reading and/or writing to the data storage cartridge 600. Similarly, the predetermined maximum threshold amount of time transpired for a rekey may be defined as the maximum amount of time that is expected to not cause errors in obtaining the key, and consequently reading and/or writing to the data storage cartridge 600. However, after the maximum number of mounts or after the maximum amount of time has transpired a rekey operation is recommended to avoid future errors in obtaining the key.

While the above examples of determining if a special operation may be performed have been described with reference to a tape rekey, one of ordinary skill in the art would understand that any special operation as described above or below may be determined in the same manner.

In one example, a request is sent to the EKM 1021 to perform decryption with an expired key. When the EKM 1021 attempts access to the expired key the EKM 1021 detects that the key has expired if the amount of time transpired since the most recent rekey is greater than the predetermined maximum threshold of time transpired. If the key is expired then it may be determined a special operation of a rekey may be performed and a target of opportunity is recognized.

The EKM 1021 performs the special operation of rekeying by translating the expired key into a new valid key. The EKM 1021 then performs the initial requested operation of decryption utilizing the new valid key (as described in FIG. 13). Thus, the data on the tape may be decrypted and a rekey may occur during a single session with the key manager. The detection of an expired key may be done based on a special grouping of keys, an indicator stored with the key, or a CRL (certificate revocation list) that indicates a special "archive" (i.e. for read use only) keystore, etc.

Another parameter may comprise an unauthorized person or entity attempting to obtain access to a key, thus creating a compromised key, herein referred to as an unauthorized request. For example, if a request is sent to the EKM 1021 to perform decryption from an unauthorized drive or user the EKM 1021 in response attempts access to the key. The EKM may detect that the tape drive or the user that is requesting the key is unauthorized and in response determines that a special operation should be performed (e.g. a rekey operation). During the target of opportunity of the open session with the EKM 1021, the EKM 1021 performs the special operation of rekeying by translating the first key into a second key. The EKM 1021 may also send an alert (e.g. and unauthorized request alert) to a user interface (such as a web-user interface or an operator panel) that a request from an unauthorized drive or user was received. In the current example the request to decrypt would not be completed since it was from an unauthorized source.

The use of "key" or "keys" is not meant to limit the invention to one key or multiple keys, In addition, for any particular data storage media, there may be combinations of data keys and key encrypting keys (KEK) for the first key and/or the second key.

Other examples of parameters for determining a special operation may need to be performed, while not limiting, include a particular date that is indicated for rekey. For example, the data storage cartridge 600 may be rekeyed on a particular date. Further, the EKM 1021 may determine whether or not a special operation may be performed based on parameters such the number of reads and/or writes since the most recent special operation. As one of ordinary skill in the art would understand these parameters may also be evaluated against predetermined criteria such as a predetermined rekey date, a predetermined maximum threshold number of reads, or predetermined maximum threshold number of writes.

Further, the EKM 1021 may determine a special operation exists based on an explicit pending request (e.g. a command to rekey the tape cartridge 600 the next time the tape cartridge 600 is mounted in the data storage drive 15). Another example may comprise a data storage cartridge export operation. For example, the data storage cartridge 600 may be rekeyed before being exported from the automated data storage library 10. Another example may comprise a key that has been revoked. For example, information from a Certificate Revocation List (CRL) may be used to cause a rekey operation for any media that uses or references a revoked key. Another example may comprise a change in security protocols for the library, the key manager, or any attached host systems. For example, the data storage cartridge 600 may be rekeyed any time a change is made to library security settings. In another example, the data storage cartridge 600 may be rekeyed any time a key is removed or changed on the key manager or its associated key store. Still further, the determination that a special operation may be performed may be based on combinations thereof.

Returning to FIG. 13, if in step 1310 no special operation is determined by the EKM 1021 then the process continues to step 1314. In step 1314, the EKM performs the request issued in step 1308. The tape drive 15 then performs the command (in step 1316) that was issued in step 1302.

Alternatively, if it is determined in step 1310 that there is a special operation to perform, then in step 1312 the EKM 1021 sends the tape drive 15 a command to perform the special operation. In response, the tape drive 15 performs the special operation. As explained above, the special operation may be rekey operation. The rekey command may include the first key or an identifier of the first key and/or may include the second key or an identifier of the second key. The first key is used to decrypt the EEDK (if present) or to decrypt the data on the data storage cartridge 600. The second key is used to encrypt the data key that was decrypted with the first key, or to encrypt the data on the data storage cartridge 600 that was decrypted with the first key. Upon receiving the requested keys, data encryption/decryption module 1029 uses the received first key, which may comprise a key encrypting key (KEK), to decrypt the encrypted data key for the coupled data storage cartridge 600 and uses the received second key to encrypt the decrypted data key for the data storage cartridge 600.

The encryption and/or decryption may be provided by the EKM 1021. In this case, key management code (not shown) within the tape drive 15 would send the actual encrypted data key to the EKM 1021 and the EKM 1021 would decrypt the encrypted data key with a first key, encrypt the data key with a second key, and send the encrypted data key to key management code. The tape drive 15 then writes the data key encrypted with the second key to the data storage cartridge 600.

The encrypted data key may be written to the storage medium of the removable storage media, or it may be written to a cartridge memory 610 associated with removable storage media 611. The tape drive 15 sends a message to the automated data storage library 10 indicating that the rekey operation completed successfully. The message may be sent on the library-drive interface as discussed above.

After the special operation is performed, such as a rekey as explained above, the EKM 1021 performs (in step 1314) the request that was initially requested in step 1308. The tape drive 15 then performs the command (in step 1316) that was issued in step 1302.

While it has been described that the special operation of step 1312 is performed before performing the request of step 1308, it would be understood by one of ordinary skill in the art that the EKM 1021 could perform the special operation(s), before or after fulfilling the initial request, but before completing the flow of the open key session with the EKM 1021.

It should be understood by one of ordinary skill in the art that while some of the above operations may be described as being performed by the automated data storage library 10 (e.g. the step of determining if a special operation may be performed) these operations may be performed by the library controller 400, or by processor 402 of library controller 400. Similarly, it should be understood by one of ordinary skill in the art that while some of the above operations may be described as being performed by the data storage drive 15 (e.g. the step of determining if a special operation may be performed) these operations may be performed by the drive controller 1027, or a processor within the drive controller (not shown).

The present embodiments provide a method, a system and a computer program product for utilizing a target of opportunity to perform additional special operations related to an initial requested operation in a transparent manner or semi-transparent manner while only requiring little, if any, additional resources and/or time. Target of opportunity allows for increased performance and/or decreased disruption. Target of opportunity when applied to a tape mounting allows the ability to perform special operations such as refreshing a tape of the tape cartridge, performing a media check, performing a servo format integrity check, performing a tape media diagnostic on the tape cartridge, performing a rekey operation, performing a key migration operation, performing a key retirement operation on an as needed basis in a transparent manner. Similarly, target of opportunity when applied to encryption allows the ability to perform operations such as key migration, key retirement, and to send an unauthorized request alert on an as needed basis in a transparent manner.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies regardless of the particular type of signal bearing media actually used to carry out the distribution. Examples of computer readable media include recordable-type media such as a floppy disk, a hard disk drive, a RAM, and CD-ROMs and transmission-type media such as digital and analog communication links.

While particular embodiments of the present invention have been shown and described, it will be obvious to those skilled in the art that, based upon the teachings herein changes and modifications may be made without departing from this invention and its broader aspects and, therefore, the appended claims are to encompass within their scope all such changes and modifications as are within the true spirit and scope of this invention. Moreover, although described above with respect to methods and systems, the need in the art may also be met with a computer program product containing instructions for encrypting data on a removable media cartridge. Furthermore, it is to be understood that the invention is solely defined by the appended claims.

What is claimed is:

1. A method comprising:
   mounting a tape cartridge in a tape drive;
   recognizing a target of opportunity exists by determining if at least one special operation may be performed by said tape drive;
   in response to determining said at least one special operation may be performed, sending a first notification that said tape drive is to remain in a not ready state;
   performing said at least one special operation; and
   in response to performing said at least one special operation, sending a second notification that said tape drive is in a ready state or an error state,
   wherein said determining said at least one special operation comprises evaluating parameters against predetermined criteria,
   wherein said at least one special operation is determined by said tape drive and said parameters are stored within said tape cartridge.

2. The method of claim 1, wherein said at least one special operation is performed on said tape cartridge.

3. The method of claim 1, wherein said mounting is performed before or after said determining if said at least one special operation may be performed.

4. The method of claim 1, wherein said determining said at least one special operation is performed by one of said tape drive and a tape library.

5. The method of claim 1, wherein said determining said at least one special operation comprises evaluating parameters against predetermined criteria.

6. The method of claim 5, wherein said predetermined criteria is defined by a user.

7. The method of claim 5, wherein said at least one special operation is determined by a tape library and said parameters are stored within said tape library.

8. The method of claim 1, wherein said parameters are stored in at least one non-user area of said tape cartridge.

9. The method of claim 1, wherein said parameters are stored in a cartridge memory of said tape cartridge.

10. The method of claim 1, wherein said determining said at least one special operation comprises recognizing an explicit pending request.

11. The method of claim 1, wherein said at least one special operation is selected from the group consisting of refreshing said tape cartridge, performing a media check, performing a servo format integrity check, performing a tape media diagnostic on said tape cartridge performing a rekey operation, performing a key migration operation, and performing a keys retirement operation.

12. A method, comprising:
   mounting a tape cartridge in a tape drive;
   recognizing a target of opportunity exists by determining if at least one special operation may be performed by said tape drive;
   in response to determining said at least one special operation may be performed, sending a first notification that said tape drive is to remain in a not ready state;
   performing said at least one special operation; and
   in response to performing said at least one special operation, sending a second notification that said tape drive is in a ready state or an error state,
   wherein said determining said at least one special operation comprises evaluating parameters against predetermined criteria,
   wherein said parameters comprise a number of mounts since a most recent identical special operation was performed.

13. The method of claim 12, wherein said predetermined criteria comprise a predetermined maximum threshold number of mounts.

14. A method, comprising:
   mounting a tape cartridge in a tape drive;
   recognizing a target of opportunity exists by determining if at least one special operation may be performed by said tape drive;
   in response to determining said at least one special operation may be performed, sending a first notification that said tape drive is to remain in a not ready state;
   performing said at least one special operation; and
   in response to performing said at least one special operation, sending a second notification that said tape drive is in a ready state or an error state,
   wherein said determining said at least one special operation comprises evaluating parameters against predetermined criteria,
   wherein said parameters comprise an amount of time transpired since a most recent identical special operation was performed.

15. The method of claim 14, wherein said predetermined criteria comprise a predetermined maximum threshold of time transpired.

16. A method, comprising:
mounting a tape cartridge in a tape drive;
recognizing a target of opportunity exists by determining if at least one special operation may be performed by said tape drive;
in response to determining said at least one special operation may be performed, sending a first notification that said tape drive is to remain in a not ready state;
performing said at least one special operation; and
in response to performing said at least one special operation sending a second notification that said tape drive is in a ready state or an error state,
wherein said determining said at least one special operation comprises evaluating parameters against predetermined criteria,
wherein said parameters are selected from the group consisting of a number of mounts since a most recent (i) refresh, (ii) media check, (iii) format integrity check, (iv) media diagnostic, (v) rekey, (vi) key retirement, and (vii) key migration.

17. A method, comprising:
mounting a tape cartridge in a tape drive;
recognizing a target of opportunity exists by determining if at least one special operation may be performed by said tape drive;
in response to determining said at least one special operation may be performed, sending a first notification that said tape drive is to remain in a not ready state;
performing said at least one special operation; and
in response to performing said at least one special operation, sending a second notification that said tape drive is in a read state or an error state,
wherein said determining said at least one special operation comprises evaluating parameters against predetermined criteria,
wherein said parameters are selected from the group consisting of an amount of time transpired since a most recent (i) refresh, (ii) media check, (iii) servo format integrity check, (iv) media diagnostic, (v) rekey, (vi) key retirement, and (vii) key migration.

18. A method comprising:
mounting a removable storage medium in a data storage drive;
recognizing a target of opportunity exists by determining if at least one special operation may be performed by said data storage drive;
in response to determining said at least one special operation may be performed, sending a first notification that said data storage drive is to remain in a not ready state;
performing said at least one special operation; and
in response to performing said at least one special operation, sending a second notification that said data storage drive is in a ready state or an error state,
wherein said at least one special operation is determined by said data storage drive and said parameters are stored within said removable storage medium.

19. The method of claim 18, wherein said determining said at least one special operation comprises at least one of evaluating parameters against predetermined criteria, and recognizing an explicit pending request.

20. The method of claim 18, wherein said at least one special operation is determined by an automated data storage library and said parameters are stored within said automated data storage library.

21. The method of claim 18, wherein said at least one special operation is performed on said removable storage medium.

22. The method of claim 18, wherein said at least one special operation is selected from the group consisting of refreshing said removable storage medium, performing it media check, performing it format integrity check, performing a media diagnostic on said removable storage media, performing a rekey operation, performing a key migration operation, and performing a key retirement operation.

23. A method comprising:
mounting a removable storage medium in a data storage drive;
recognizing a target of opportunity exists by determining if at least one special operation may be performed by said data storage drive;
in response to determining said at least one special operation may be performed, sending a first notification that said data storage drive is to remain in a not ready state;
performing said at least one special operation; and
in response to performing said at least one special operation, sending a second notification that said data storage drive is in a ready state or an error state,
wherein said determining said at least one special operation comprises at least one of evaluating parameters against predetermined criteria, and recognizing an explicit pending request,
wherein said parameters comprises the number of mounts or an amount of time transpired since a most recent identical special operation was performed, and wherein said predetermined criteria comprises a predetermined maximum threshold number of mounts or a predetermined maximum threshold of time, respectively.

* * * * *